(12) United States Patent
Tasaka et al.

(10) Patent No.: US 10,138,403 B2
(45) Date of Patent: Nov. 27, 2018

(54) COMPOSITION FOR HEAT CYCLE SYSTEM AND HEAT CYCLE SYSTEM

(71) Applicant: ASAHI GLASS COMPANY, LIMITED, Chiyoda-ku (JP)

(72) Inventors: Mai Tasaka, Chiyoda-ku (JP); Masato Fukushima, Chiyoda-ku (JP); Hiroaki Mitsuoka, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/791,751

(22) Filed: Oct. 24, 2017

(65) Prior Publication Data

US 2018/0044567 A1    Feb. 15, 2018

Related U.S. Application Data

(63) Continuation of application No. PCT/JP2016/062769, filed on Apr. 22, 2016.

(30) Foreign Application Priority Data

Apr. 24, 2015 (JP) ................. 2015-089776

(51) Int. Cl.

| | | |
|---|---|---|
| C09K 5/04 | (2006.01) | |
| C10M 101/02 | (2006.01) | |
| C10M 105/04 | (2006.01) | |
| C10M 105/18 | (2006.01) | |
| C10M 105/32 | (2006.01) | |
| C10M 107/02 | (2006.01) | |
| C10M 107/24 | (2006.01) | |
| C10M 107/34 | (2006.01) | |
| F25B 1/00 | (2006.01) | |
| F25B 1/053 | (2006.01) | |

(52) U.S. Cl.
CPC ............... *C09K 5/044* (2013.01); *C09K 5/04* (2013.01); *C10M 101/02* (2013.01); *C10M 105/04* (2013.01); *C10M 105/18* (2013.01); *C10M 105/32* (2013.01); *C10M 107/02* (2013.01); *C10M 107/24* (2013.01); *C10M 107/34* (2013.01); *F25B 1/00* (2013.01); *F25B 1/053* (2013.01); *C09K 2205/126* (2013.01); *C09K 2205/22* (2013.01)

(58) Field of Classification Search
CPC .................... C09K 5/044; C09K 5/04
USPC ............................. 252/67, 68, 69
See application file for complete search history.

(56) References Cited

U.S. PATENT DOCUMENTS

| | | | |
|---|---|---|---|
| 9,593,274 B2* | 3/2017 | Fukushima | ............ C09K 5/044 |
| 2010/0076231 A1* | 3/2010 | Nappa | ...................... C07C 17/23 |
| | | | 570/156 |
| 2010/0181524 A1 | 7/2010 | Elsheikh et al. | |
| 2011/0012052 A1 | 1/2011 | Van Horn et al. | |
| 2012/0292556 A1 | 11/2012 | Van Horn | |
| 2014/0070132 A1 | 3/2014 | Fukushima | |
| 2014/0077122 A1 | 3/2014 | Fukushima | |
| 2014/0077123 A1 | 3/2014 | Fukushima | |
| 2016/0355716 A1* | 12/2016 | Fukushima | ............ C09K 5/045 |

FOREIGN PATENT DOCUMENTS

| | | | |
|---|---|---|---|
| CN | 104449580 A | * | 3/2015 |
| EP | 2 711 405 A1 | | 3/2014 |
| EP | 2 711 406 A1 | | 3/2014 |
| EP | 2 711 407 A1 | | 3/2014 |
| JP | 2010-531924 | | 9/2010 |
| JP | 2010-531927 | | 9/2010 |
| JP | 2013-518171 | | 5/2013 |
| JP | 2013-249326 | | 12/2013 |
| JP | 5825345 | | 12/2015 |
| WO | WO 2009/003165 A1 | | 12/2008 |
| WO | WO 2009/151669 A1 | | 12/2009 |
| WO | WO 2011/091404 A1 | | 7/2011 |
| WO | WO 2012/157763 A1 | | 11/2012 |
| WO | WO 2012/157764 A1 | | 11/2012 |
| WO | WO 2012/157765 A1 | | 11/2012 |
| WO | WO 2014/080868 A1 | | 5/2014 |

OTHER PUBLICATIONS

CAS reg. No. 3110-38-1, Nov. 16, 1984. (Year: 1984).*
International Search Report dated Jun. 7, 2016 in PCT/JP2016/062769, filed on Apr. 22, 2016 (with English Translation).
Written Opinion dated Jun. 7, 2016 in PCT/JP2016/062769, filed on Apr. 22, 2016.

* cited by examiner

*Primary Examiner* — Douglas J Mc Ginty
(74) *Attorney, Agent, or Firm* — Oblon, McClelland, Maier & Neustadt, L.L.P.

(57) ABSTRACT

There are provided a composition for a heat cycle system containing a working medium for heat cycle that has a low global warming potential and high stability, which can be used as a substitute for HFC-134a and HFC-245fa, and a heat cycle system using this composition. The composition for a heat cycle system contains: a working medium for heat cycle containing 1-chloro-2,3,3,3-tetrafluoropropene; and a stabilizer suppressing deterioration of the working medium for heat cycle such as an oxidation resistance improver, a heat resistance improver, or a metal deactivator, and the heat cycle system uses this composition for a heat cycle system.

14 Claims, 2 Drawing Sheets

COMPOSITION FOR HEAT CYCLE SYSTEM AND HEAT CYCLE SYSTEM

CROSS-REFERENCE TO RELATED APPLICATIONS

This application is a continuation of prior International Application No. PCT/JP2016/062769 filed on Apr. 22, 2016 which is based upon and claims the benefit of priority from Japanese Patent Application No. 2015-089776 filed on Apr. 24, 2015; the entire contents of all of which are incorporated herein by reference.

FIELD

The present invention relates to a composition for a heat cycle system, and a heat cycle system using the composition.

BACKGROUND

In this description, abbreviated names of halogenated hydrocarbon compounds are described in brackets after the compound names, and in this description, the abbreviated names are employed in place of the compound names as necessary.

Conventionally, as a working medium for a heat cycle system such as a refrigerant for a refrigerator, a refrigerant for an air-conditioning apparatus, a working medium for a power generation system (such as an exhaust heat recovery power generation), a working medium for a latent heat transport apparatus (such as a heat pipe), or a secondary cooling medium, chlorofluorocarbon (CFC) such as chlorotrifluoromethane or dichlorodifluoromethane, and hydrochlorofluorocarbon (HCFC) such as chlorodifluoromethane have been used. However, effects of CFC and HCFC on the ozone layer in the stratosphere have been pointed out, and they are subjected to regulation at present.

Under such circumstances, as a working medium for heat cycle, hydrofluorocarbons (HFC) having less effect on the ozone layer, such as difluoromethane (HFC-32), tetrafluoroethane, and pentafluoroethane (HFC-125), have been used in place of CFC and HCFC. For example, R410A (a pseudoazeotropic mixed refrigerant of HFC-32 and HFC-125 at a mass ratio of 1:1) or the like is a refrigerant that has been widely used conventionally. However, it has been pointed out that HFCs may cause global warming.

For example, 1,1,1,2-tetrafluoroethane (HFC-134a) used as a refrigerant for an automobile air conditioner has a global warming potential so high as 1430 (100 years). Further, in an automobile air conditioner, the refrigerant is highly likely to leak out to the air from a connection hose, a bearing, or the like.

As a refrigerant to be used in place of HFC-134a, carbon dioxide and 1,1-difluoroethane (HFC-152a) having a global warming potential of 124 (100 years) that is lower as compared with HFC-134a, have been under consideration.

However, with carbon dioxide, the equipment pressure tends to be extremely high as compared with HFC-134a, and therefore, there are many problems that should be solved in applying carbon dioxide to all automobiles. HFC-152a has a combustion range, and has a problem for securing the safety.

Further, HFC-134a has been used as a working medium of a centrifugal refrigerator (to be also called a turbo refrigerator). The centrifugal refrigerator is to be used for cooling and heating of buildings and in plants of producing industrial cold-water, and the like. As the working medium of the centrifugal refrigerator, flon such as CFC-11 has been used, but, in relation to the recent ozone layer destruction problem, production and use of flon have been regulated internationally, and therefore, flon is being converted to a working medium using hydrogen-containing flon not containing chlorine such as, for example, tetrafluoroethane (HFC-134a) or pentafluoropropane (HFC-245fa).

Here, HFC-134a has a global warming potential of 1430 (100 years), which is large. Further, HFC-245fa has a global warming potential of 1030 (100 years), but is highly toxic. In the centrifugal refrigerator, an amount of the working medium to be filled is larger as compared with another refrigerator and a heat pump. In a centrifugal refrigerator having a 500-refrigeration ton class capacity, for example, about 700 to 800 kg of a working medium is filled. The centrifugal refrigerator is often installed in a machine room of a building, and even if leakage of the working medium occurs due to an accident, or the like, there is a possibility that the working medium in large amounts is to be released into the air. As above, the working medium to be used for the centrifugal refrigerator is strongly required to have not only a small global warming potential environmentally, but also high safety, namely low toxicity or low flammability particular.

In recent years, expectations are concentrated on compounds having a carbon-carbon double bond such as hydrofluoroolefin (HFO), hydrochlorofluoroolefin (HCFO), and chlorofluoroolefin (CFO), which are a working medium having less effect on the ozone layer and less effect on global warming because the carbon-carbon double bond is likely to be decomposed by OH radicals in the air. In this description, saturated HFC is called HFC and discriminated from HFO unless otherwise stated. Further, HFC may be clearly described as saturated hydrofluorocarbon in some cases.

Among HFO, HCFO, and CFO each having the carbon-carbon double bond described above, HCFO and CFO are compounds having suppressed flammability because they are high in proportion of halogen in one molecule. Therefore, as a working medium having less effect on the ozone layer and less effect on global warming and further having suppressed flammability, using HCFO and CFO has been considered. As such a working medium, a working medium using 1-chloro-2,3,3,3-tetrafluoropropene (to be referred to as "HCFO-1224yd" hereinafter) (for example, see Patent Document WO 2012/157763 A1), which is, for example, hydrochlorofluoropropene, has been known.

However, HCFO-1224yd is a compound having an unsaturated bond in its molecule and is a compound having a very short life in the air, and accordingly, under conditions that compression and heating are repeatedly performed in a heat cycle, it has a problem of being inferior in stability to saturated hydrofluorocarbon or hydrochlorofluorocarbon such as conventional HFC or HCFC.

Thus, there has been desired a method capable of efficiently operating a heat cycle system using HCFO-1224yd as a working medium, with improved stability while sufficiently taking advantage of cycle performance of HCFO-1224yd.

SUMMARY

The present invention has been made from the above-described viewpoints, and its object is to provide a composition for a heat cycle system containing 1-chloro-2,3,3,3-tetrafluoropropene (HCFO-1224yd) with more stabilized HCFO-1224yd, while sufficiently taking advantage of a low global warming potential and excellent cycle performance of HCFO-1224yd, and a heat cycle system that uses the composition and has both less effect on global warming and high cycle performance, and further has prolonged the use life of the working medium for heat cycle.

[1] A composition for a heat cycle system containing: a working medium for heat cycle containing 1-chloro-2,3,3,3-tetrafluoropropene; and a stabilizer suppressing deterioration of the working medium for heat cycle.

[2] The composition for a heat cycle system according to [1], in which the 1-chloro-2,3,3,3-tetrafluoropropene contains (Z)-1-chloro-2,3,3,3-tetrafluoropropene and (E)-1-chloro-2,3,3,3-tetrafluoropropene at a ratio of 51:49 to 100:0 by mass ratio represented by (Z)-1-chloro-2,3,3,3-tetrafluoropropene:(E)-1-chloro-2,3,3,3-tetrafluoropropene.

[3] The composition for a heat cycle system according to [1], in which
the stabilizer is at least one type of stabilizer selected from the group consisting of an oxidation resistance improver, a heat resistance improver, and a metal deactivator.

[4] The composition for a heat cycle system according to [3], in which
the stabilizer is at least one type of compound selected from the group consisting of a phenol compound, an unsaturated hydrocarbon group-containing aromatic compound, an aromatic amine compound, an aromatic thiazine compound, a terpene compound, a quinone compound, a nitro compound, an epoxy compound, a lactone compound, an orthoester compound, a mono- or di-alkali metal salt compound of phthalic acid, and a thiodiphenyl ether hydroxide compound.

[5] The composition for a heat cycle system according to [1], in which
the composition contains 1 mass ppm to 10 mass % of the stabilizer.

[6] The composition for a heat cycle system according to [1], further containing a refrigerant oil.

[7] The composition for a heat cycle system according to [6], in which
the refrigerant oil is at least one type selected from the group consisting of an ester-based refrigerant oil, an ether-based refrigerant oil, a hydrocarbon-based refrigerant oil, and a naphthenic refrigerant oil.

[8] The composition for a heat cycle system according to [1], in which
the working medium for heat cycle further contains saturated hydrofluorocarbon.

[9] The composition for a heat cycle system according to [1], in which
the working medium for heat cycle further contains hydrofluoroolefin.

[10] The composition for a heat cycle system according to [1], in which
the working medium for heat cycle further contains hydrochlorofluoroolefin other than the 1-chloro-2,3,3,3-tetrafluoropropene.

[11] The composition for a heat cycle system according to [1], in which
a proportion of the 1-chloro-2,3,3,3-tetrafluoropropene to the working medium for heat cycle is 10 to 100 mass %.

[12] The composition for a heat cycle system according to [11], in which
a content of the 1-chloro-2,3,3,3-tetrafluoropropene with respect to 100 mass % of the working medium for heat cycle is 20 to 95 mass %.

[13] A heat cycle system using the composition for a heat cycle system according to [1].

[14] The heat cycle system according to [13], in which the heat cycle system is a refrigerating apparatus, an air-conditioning apparatus, a power generation system, a heat transport apparatus, or a secondary cooling machine.

[15] The heat cycle system according to [13], in which the heat cycle system is a centrifugal refrigerator.

[16] The heat cycle system according to [13], in which the heat cycle system is a low-pressure centrifugal refrigerator.

According to the present invention, it is possible to provide a composition for a heat cycle system containing 1-chloro-2,3,3,3-tetrafluoropropene (HCFO-1224yd) with a more stabilized working medium for heat cycle containing HCFO-1224yd while sufficiently taking advantage of a low global warming potential and excellent cycle performance of HCFO-1224yd.

The heat cycle system of the present invention is a heat cycle system that has both less effect on global warming and high cycle performance, and has further stabilized the working medium for heat cycle and has enabled efficient operation.

DETAILED DESCRIPTION

Figure 1:
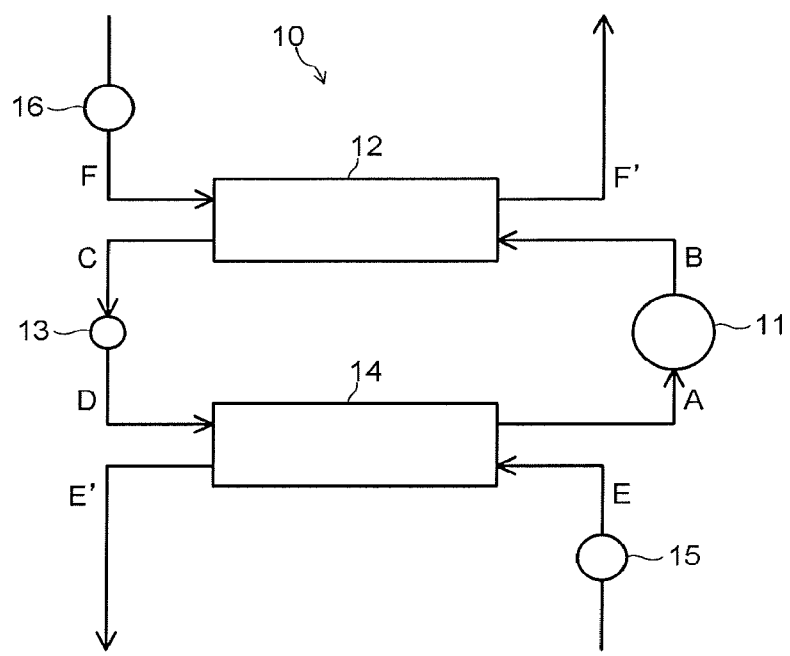
FIG. 1 is a schematic configuration diagram illustrating a refrigeration cycle system being one example of a heat cycle system of the present invention.

Hereinafter, there will be explained an embodiment of the present invention.

[Composition for a Heat Cycle System]

A composition for a heat cycle system contains: a working medium for heat cycle containing HCFO-1224yd; and a stabilizer suppressing deterioration of the working medium for heat cycle.

As a heat cycle system to which the composition for a heat cycle system of the present invention is applied, a heat cycle system having a heat exchanger such as a condenser or an evaporator is used without any particular limitation. The heat cycle system, for example, a refrigeration cycle system, has a mechanism in which a gaseous working medium is compressed by a compressor and cooled by a condenser to form a high-pressure liquid, the pressure of the liquid is lowered by an expansion valve, and the liquid is vaporized at low temperature by an evaporator so that heat is removed by the heat of vaporization.

When HCFO-1224yd is used as the working medium for heat cycle for such a heat cycle system, depending on the temperature conditions and the pressure conditions, HCFO-1224yd is sometimes destabilized to be decomposed, thus impairing the function of the working medium for heat cycle. In the composition for a heat cycle system of the present invention, HCFO-1224yd is made to coexist with a stabilizer, to thereby suppress the decomposition of HCFO-1224yd to make HCFO-1224yd stable, resulting in that it becomes possible to prolong the life as the heat cycle working medium.

Hereinafter, there will be explained respective components to be contained in the composition for a heat cycle system of the present invention.

<Working Medium>

The composition for a heat cycle system of the present invention contains HCFO-1224yd as the heat cycle working medium. The heat cycle working medium to be used for the present invention may contain a later-described optional component as necessary in addition to HCFO-1224yd. The content of HCFO-1224yd with respect to 100 mass % of the working medium is preferably 10 mass % or more, more preferably 10 to 100 mass %, further preferably 20 to 100 mass %, still more preferably 40 to 100 mass %, still further preferably 60 to 100 mass %, and most preferably 90 to 100 mass %.

The working medium for heat cycle of the present invention preferably contains 20 mass % or more and 95 mass % or less of HCFO-1224yd in the case of a mixture.

(HCFO-1224yd)

HCFO-1224yd has, as described above, halogen that suppresses flammability and a carbon-carbon double bond that is likely to be decomposed by OH radicals in the air in its molecule, and is a working medium for heat cycle that has suppressed flammability and has less effect on the ozone layer and less effect on global warming.

As for HCFO-1224yd, two geometric isomers: (E)-1-chloro-2,3,3,3-tetrafluoropropene (HCFO-1224yd(E)) being an E-isomer; and (Z)-1-chloro-2,3,3,3-tetrafluoropropene (HCFO-1224yd(Z)) being a Z-isomer exist. In the present invention, HCFO-1224yd without description of (E), (Z) indicates HCFO-1224yd(E), HCFO-1224yd(Z), or a mixture of HCFO-1224yd(E) and HCFO-1224yd(Z) mixed at an arbitrary ratio. Further, compounds each having a carbon-carbon double bond in its molecule and containing an E-isomer and a Z-isomer are also described similarly.

HCFO-1224yd(Z) has higher chemical stability than HCFO-1224yd(E) and is preferred as the working medium for heat cycle. Therefore, the ratio of HCFO-1224yd(Z) and HCFO-1224yd(E) in HCFO-1224yd is preferred to be 51:49 to 100:0 and more preferred to be 80:20 to 90:10 by mass ratio represented by HCFO-1224yd(Z):HCFO-1224yd(E). As long as HCFO-1224yd(Z):HCFO-1224yd(E) is equal to or more than the above-described lower limit value, a longer-period stable composition for a heat cycle system can be obtained because HCFO-1224yd contains more HCFO-1224yd(Z). Furthermore, HCFO-1224yd(Z):HCFO-1224yd(E) being equal to or less than the above-described upper limit value makes it possible to suppress an increase in production cost caused by separating a Z-isomer and an E-isomer of HCFO-1224yd by distillation, or the like. In the meantime, from the viewpoint of stability, the mass ratio represented by HCFO-1224yd(Z):HCFO-1224yd(E) is preferred to be 95:5 to 100:0.

Properties of HCFO-1224yd as a working medium are illustrated in Table 1 in terms of relative comparison with HFC-245fa and HFC-134a. The cycle performance is expressed by coefficient of performance and refrigerating capacity obtained by later-described methods. The coefficient of performance and the refrigerating capacity of HCFO-1224yd are described as relative values (to be hereinafter referred to as "relative coefficient of performance" and "relative refrigerating capacity" respectively) using those of HFC-245fa as references (1.000). The GWP is the value over 100 years described in the Intergovernmental Panel on Climate Change (IPCC) Fourth Assessment Report (2007), or measured according to a method described in this report. In this description, the GWP means this value unless otherwise stated.

TABLE 1

|  | HFC-245fa | HFC-134a | HCFO-1224yd |
|---|---|---|---|
| Relative coefficient of performance | 1.000 | 0.939 | 0.997 |
| Relative refrigerating capacity | 1.000 | 4.124 | 1.473 |
| GWP | 1030 | 1430 | 10 or less |

[Optional Component]

The working medium for heat cycle to be used for the present invention may optionally contain a compound ordinarily used as a working medium, other than HCFO-1224yd, within a range not impairing the effects of the present invention. As such an optional compound (optional component), for example, there can be cited HFC, HFO, HCFO other than HCFO-1224yd, and components to be vaporized and liquefied together with HCFO-1224yd, other than these, and so on. The optional component is preferred to be HFC, HFO, and HCFO other than HCFO-1224yd.

The optional component is preferred to be a compound capable of keeping the GWP and a temperature glide within acceptable ranges while having an effect to further improve the above-described relative coefficient of performance and relative refrigerating capacity, when used for the heat cycle in combination with HCFO-1224yd. When the working medium contains such a compound in combination with HCFO-1224yd, more favorable cycle performance can be obtained while keeping a low GWP, and an effect by the temperature glide is also small.

(Temperature Glide)

When the working medium contains an optional component, the working medium has a considerable temperature glide except for the case where HCFO-1224yd and the optional component form an azeotropic composition. The temperature glide of the working medium varies depending on the type of the optional component and a mixing ratio of HCFO-1224yd and the optional component.

When the mixture is used as the working medium, an azeotropic mixture or a pseudoazeotropic mixture such as R410A is preferably used ordinarily. A non-azeotropic composition has a problem of undergoing a composition change when put into a refrigerating and air-conditioning apparatus from a pressure container. Further, when a refrigerant leaks out from a refrigerating and air-conditioning apparatus, a refrigerant composition in the refrigerating and air-conditioning apparatus is highly likely to change, resulting in difficulty in recovery of the refrigerant composition to an initial state. In the meantime, the above-described problems can be avoided as long as the working medium is an azeotropic or pseudoazeotropic mixture.

As an index to measure applicability of the mixture to the working medium, the "temperature glide" is commonly employed. The temperature glide is defined as properties that the initiation temperature and the completion temperature of a heat exchanger, for example, of evaporation in an evaporator or of condensation in a condenser differ from each other. The temperature glide of the azeotropic mixture is 0, and as for the pseudoazeotropic mixture, like the temperature glide of R410A being 0.2, for example, the temperature glide is extremely close to 0.

The case where the temperature glide is large is a problem because, for example, an inlet temperature of an evaporator decreases, to make frosting more likely to occur. Further, in the heat cycle system, in order to improve heat exchange efficiency, it is common to make the working medium flowing in a heat exchanger and a heat source fluid such as water or the air flow in counter-current flow, and the temperature difference of the heat source fluid is small in a stable operation state, and therefore, it is difficult to obtain a heat cycle system with good energy efficiency in the case of a non-azeotropic mixed medium with a large temperature glide. Accordingly, when the mixture is used as the working medium, a working medium with an appropriate temperature glide is desired.

(HFC)

HFC being an optional component is preferably selected from the above-described viewpoint. Here, HFC is known to be higher in GWP than HCFO-1224yd. Therefore, HFC to be combined with HCFO-1224yd is preferably selected appropriately particularly from the viewpoint of keeping the GWP within an acceptable range, in addition to improving the cycle performance as the above-described working medium and keeping the temperature glide within an appropriate range.

As HFC having less effect on the ozone layer and having less effect on global warming, concretely, HFC with 1 to 5 carbon atoms is preferred. HFC may be linear, branched, or cyclic.

Examples of HFC include HFC-32, difluoroethane, trifluoroethane, tetrafluoroethane, HFC-125, pentafluoropropane, hexafluoropropane, heptafluoropropane, pentafluorobutane, heptafluorocyclopentane, and so on.

Among them, as HFC, 1,1,2,2-tetrafluoroethane (HFC-134), 1,1,1,2-tetrafluoroethane (HFC-134a), 1,1,1,3,3-pentafluoropropane (HFC-245fa), and 1,1,1,3,3-pentafluorobutane (HFC-365mfc) are preferred, and HFC-134a, HFC-245fa, and HFC-365mfc are more preferred in terms of having less effect on the ozone layer and being excellent in refrigeration cycle property.

One type of HFC may be used independently, or two or more types may be used in combination.

The content of HFC in the working medium for heat cycle (100 mass %) to be used for the present invention is as follows, for example. In the case of HFC being HFC-134a, the refrigerating capacity improves without causing a large decrease in coefficient of performance in a range of 1 to 90 mass %. In the case of HFC being HFC-245fa, the refrigerating capacity improves without causing a large decrease in coefficient of performance in a range of 1 to 60 mass %. The content of HFC can be controlled according to required properties of the working medium.

(HFO)

HFO is also preferably selected from the same viewpoint as HFC described above. Incidentally, the GWP of HFO is an order of magnitude lower than HFC. Accordingly, HFO to be combined with HCFO-1224yd is preferably selected appropriately with a view of improving the cycle performance as the above-described working medium and keeping the temperature glide within an appropriate range particularly, rather than considering the GWP.

Examples of HFO include 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), (E)-1,2,3,3,3-pentafluoropropene (HFO-1225ye(E)), (Z)-1,2,3,3,3-pentafluoropropene (HFO-1225ye(Z)), (E)-1,3,3,3-tetrafluoropropene (HFO-1234ze(E)), (Z)-1,3,3,3-tetrafluoropropene (HFO-1234ze(Z)), 3,3,3-trifluoropropene (HFO-1243zf), (E)-1,1,1,4,4,4-hexafluoro-2-butene (HFO-1336mzz(E)), and (Z)-1,1,1,4,4,4-hexafluoro-2-butene (HFO-1336mzz(Z)).

As HFO, HFO-1234yf, HFO-1234ze(E), HFO-1234ze(Z), HFO-1336mzz(E), HFO-1336mzz(Z), and HFO-1243zf are preferred, HFO-1234yf, HFO-1234ze(E), HFO-1234ze(Z), HFO-1336mzz(E), and HFO-1336mzz(Z) are more preferred, and HFO-1234yf, HFO-1234ze(E), HFO-1234ze(Z), and HFO-1336mzz(Z) are most preferred. One type of HFO may be used independently, or two or more types may be used in combination.

The content of HFO in the working medium for heat cycle (100 mass %) to be used for the present invention can be selected optionally according to the required properties of the working medium. For example, the content of HFO being 1 to 40 mass % provides a heat cycle system excellent in cycle performance (efficiency and capability) as compared with a working medium of HCFO-1224yd.

(HCFO Other than HCFO-1224yd)

HCFO as an optional component other than HCFO-1224yd is also preferably selected from the viewpoints similar to those of HFC described above. Incidentally, the GWP of HCFO, which is other than HCFO-1224yd, is an order of magnitude lower than HFC. Accordingly, HCFO other than HCFO-1224yd to be combined with HCFO-1224yd is preferably selected appropriately with a view of improving the cycle performance as the above-described working medium and keeping the temperature glide within an appropriate range particularly, rather than considering the GWP.

Examples of HCFO other than HCFO-1224yd include 1-chloro-2,2-difluoroethylene (HCFO-1122), 1,2-dichlorofluoroethylene (HCFO-1121), 1-chloro-2-fluoroethylene (HCFO-1131), 2-chloro-3,3,3-trifluoropropene (HCFO-1233xf), and 1-chloro-3,3,3-trifluoropropene (HCFO-1233zd).

Among them, as HCFO other than HCFO-1224yd, HCFO-1233zd is preferred in terms of having a high critical temperature and being excellent in durability and coefficient of performance. One type of HCFO other than HCFO-1224yd may be used independently, or two or more types may be used in combination.

The content of HCFO other than HCFO-1224yd in the working medium for heat cycle (100 mass %) is preferably 1 to 90 mass %, and more preferably 1 to 40 mass %. The content of HCFO other than HCFO-1224yd being 1 to 40 mass % provides a heat cycle system excellent in cycle performance (efficiency and capability) as compared with a working medium of HCFO-1224yd.

(Other Optional Component)

The working medium to be used for the composition for a heat cycle system of the present invention may contain, other than the above-described optional component, carbon dioxide, a hydrocarbon, chlorofluoroolefin (CFO), hydrochlorofluoroolefin (HCFO), and so on. As other optional components, components having less effect on the ozone layer and having less effect on global warming are preferred.

Examples of the hydrocarbon include propane, propylene, cyclopropane, butane, isobutane, pentane, isopentane, and so on. One type of hydrocarbons may be used independently, or two or more types may be used in combination.

When the above-described working medium contains a hydrocarbon, its content is less than 10 mass %, preferably 1 to 5 mass %, and more preferably 3 to 5 mass % with respect to 100 mass % of the working medium. As long as the content of hydrocarbon is equal to or more than the lower limit value, solubility of a mineral refrigerant oil to the working medium becomes better.

Examples of CFO includes chlorofluoropropene, chlorofluoroethylene, and so on. In terms of easily suppressing the flammability of the working medium without greatly decreasing the cycle performance of the working medium, 1,1-dichloro-2,3,3,3-tetrafluoropropene (CFO-1214ya), 1,3-dichloro-1,2,3,3-tetrafluoropropene (CFO-1214yb), 1,2-dichloro-1,2-difluoroethylene (CFO-1112) are preferred as CFO.

One type of CFO may be used independently, or two or more types may be used in combination.

When the working medium contains CFO, its content is less than 10 mass %, preferably 1 to 8 mass %, and more preferably 2 to 5 mass % with respect to 100 mass % of the working medium. As long as the content of CFO is equal to or more than the lower limit value, the flammability of the working medium is easily suppressed. As long as the content of CFO is equal to or less than the upper limit value, excellent cycle performance is easily obtained.

When the working medium to be used for the composition for a heat cycle system of the present invention contains the above-described other optional components, the total content of the other optional components in the working medium for heat cycle is preferably less than 10 mass %, more preferably 8 mass % or less, and further preferably 5 mass % or less with respect to 100 mass % of the working medium for heat cycle.

<Stabilizer>

The composition for a heat cycle system of the present invention contains a stabilizer together with the working medium containing HCFO-1224yd described above. The stabilizer only needs to be one capable of preventing deterioration of the working medium, particularly, HCFO-1224yd described above, and can be used without being limited in particular. As such a stabilizer, there can be cited an oxidation resistance improver, a heat resistance improver, a metal deactivator, and so on.

The content of the stabilizer only needs to be within a range not significantly decreasing the effects of the present invention, and is 1 mass ppm to 10 mass % and preferably 5 mass ppm to 5 mass % in the composition for a heat cycle system (100 mass %).

As the oxidation resistance improver and the heat resistance improver, there can be cited a phenol compound, an unsaturated hydrocarbon group-containing aromatic compound, an aromatic amine compound, an aromatic thiazine compound, a terpene compound, a quinone compound, a nitro compound, an epoxy compound, a lactone compound, an orthoester compound, a mono- or di-alkali metal salt compound of phthalic acid, a thiodiphenyl ether hydroxide compound, and so on.

Concrete examples of the phenol compound include phenol, 1,2-benzenediol, 1,3-benzenediol, 1,4-benzenediol, 1,3,5-benzenetriol, 2,6-di-tert-butyl-4-methylphenol, 2,6-di-tert-butyl-4-ethylphenol, 2,4,6-tri-tert-butylphenol, 2,4-dimethyl-6-tert-butylphenol, 2-tert-butylphenol, 3-tert-butylphenol, 4-tert-butylphenol, 2,4-di-tert-butylphenol, 2,6-di-tert-butylphenol, 4,6-di-tert-butylphenol, 1-cresol, 2-cresol, 3-cresol, 2,4-dimethylphenol, 2,5-dimethylphenol, 2,6-dimethylphenol, 2,3,6-trimethylphenol, 2,4,6-trimethylphenol, 2,5,6-trimethylphenol, 3-isopropylphenol, 2-isopropyl-5-methylphenol, 2-methoxyphenol, 3-methoxyphenol, 4-methoxyphenol, 2-ethoxyphenol, 3-ethoxyphenol, 4-ethoxyphenol, 2-propoxyphenol, 3-propoxyphenol, 4-propoxyphenol, tert-butylcatechol, 4-tert-butylpyrocatechol, 4,4'-methylenebis(2,6-di-tert-butylphenol), 4,4'-bis(2,6-di-tert-butylphenol), 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-isopropylidenebis(2,6-di-tert-butylphenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,2'-methylenebis(4-ethyl-6-tert-butylphenol), and so on.

Examples of the unsaturated hydrocarbon group-containing aromatic compound include α-methyl styrene, p-isopropenyltoluene, and diisopropenylbenzene.

Examples of the aromatic amine compound and the aromatic thiazine compound include 4,4-thiobis(6-butyl-m-cresol), 4,4'-thiobis(2-methyl-6-tert-butylphenol), 4,4'-thiobis(3-methyl-6-tert-butylphenol), 2,2'-thiobis(4-methyl-6-tert-butylphenol), N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, 1,1'-dinaphthylamine, 2,2'-dinaphthylamine, phenothiazine, N-alkylphenothiazine, and so on.

Examples of the terpene compound include geraniol, nerol, linalol, citral (including geranial), citronellol, menthol, d-limonene,l-limonene, terpineol, carvone, ionone, thujone, camphor, myrcene, retinal, farnesol, phytol, vitamin A1, terpinene, δ-3-carene, terpinolene, phellandrene, fenchene, and so on.

Examples of the quinone compound include hydroquinone, 1,4-benzoquinone, tocopherol, tert-butylhydroquinone, and another hydroquinone derivative.

Examples of the nitro compound include nitromethane, nitroethane, nitropropane, and so on.

Examples of the epoxy compound include n-butylphenyl glycidyl ether, isobutylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, polyalkylene glycol diglycidyl ether, glycidyl methylphenyl ether, 1,4-diglycidyl phenyl diether, 4-methoxyphenyl glycidyl ether, a derivative thereof, glycidyl-2,2-dimethyl octanoate, glycidyl benzoate, glycidyl acrylate, glycidyl methacrylate, n-butyl glycidyl ether, isobutyl glycidyl ether, hexanediol diglycidyl ether, butyl, hexyl, benzyl, cyclohexyl, methoxyethyl, octyl, phenyl and butylphenyl esters of epoxidized fatty acid monoepoxy stearic acid, 1,2-epoxypropane, 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1,2-epoxyicosane, 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Besides, a lactone compound such as α-acetolactone, β-propiolactone, γ-butyrolactone, δ-valerolactone, or ε-caprolactone, an orthoester compound such as trimethyl orthoformate, triethyl orthoformate, trimethyl orthoacetate, or triethyl orthoacetate, a mono- or di-alkali metal salt compound of phthalic acid, or the like may be added as the stabilizer.

These stabilizers have a function to suppress decomposition of the refrigerant by heat or oxygen, to stabilize the refrigerant oil, and further to suppress decomposition of the refrigerant by acid generated by decomposition of the refrigerant oil and to protect a metal material in the heat cycle system under conditions that the refrigerant is repeatedly compressed and heated in the refrigeration cycle system.

Among these stabilizers, from the viewpoint of the above functions, 2,6-di-tert-butyl-4-methylphenol, 2,6-di-(tert-butyl)phenol, nitromethane, 1,4-benzoquinone, 3-methoxyphenol, phenothiazine, and so on can be cited as a preferred compound.

One type of the oxidation resistance improver and the heat resistance improver may be used independently, or two or more types may be used in combination.

Further, examples of the metal deactivator include heterocyclic nitrogen-containing compounds such as an imidazole compound, a thiazole compound, and a triazole compound, an amine salt of an alkyl acid phosphate, and a derivative thereof.

As the imidazole compound and the thiazole compound, imidazole, benzimidazole, 2-mercaptobenzothiazole, 2,5-dimercaptothiadiazole, salicylidene-propylenediamine, pyrazole, 3,5-dimethylpyrazole, 2-mercaptobenzimidazole, 2-methylbenzamidazole, or triazoles may be contained.

The triazole compound is selected from 2-(2'-hydroxy-5'-methylphenyl)benzotriazole, 2-(2'-hydroxy-3'-tert-butyl-5'-methylphenyl)-5-chloro-benzotriazole, 1,2,3-benzotriazole, 1-[(N,N-bis-2-ethylhexyl)aminomethyl]benzotriazole, methylenebisbenzotriazole, tolyltriazole, and so on. Further, an organic acid or its ester, a primary, secondary or tertiary aliphatic amine, an amine salt of an organic acid or inorganic acid, a derivative thereof, or the like may be added.

One type of these metal deactivators may be used independently, or two or more types may be used in combination.

<Refrigerant Oil>

Further, the composition for a heat cycle system of the present invention can contain, in the same manner as an ordinary composition for a heat cycle system, a refrigerant oil in addition to the above-described working medium and stabilizer.

The refrigerant oil is roughly classified into a mineral refrigerant oil and a synthetic refrigerant oil. Examples of the mineral refrigerant oil includes a naphthenic refrigerant oil and a paraffinic refrigerant oil, and typical examples of the synthetic refrigerant oil include an ester-based refrigerant oil, an ether-based refrigerant oil, a hydrocarbon-based refrigerant oil, and so on.

Among them, in terms of compatibility with HCFO-1224yd being the essential working medium component of the present invention, oxygenated synthetic refrigerant oils such as an ester-based refrigerant oil and an ether-based refrigerant oil, a hydrocarbon-based refrigerant oil, and a naphthenic refrigerant oil are preferred and a dibasic acid ester, a polyol ester, a complex ester, a polyol carbonic acid ester, polyvinyl ether, a polyalkylene glycol, alkyl benzene, and a naphthenic refrigerant oil are preferred.

One type of these refrigerant oils may be used independently, or two or more types may be used in combination. Further, the kinematic viscosity of the refrigerant oil at 40° C. is preferably 1 to 750 mm$^2$/s and more preferably 1 to 400 mm$^2$/s in terms of the fact that lubricating properties and sealing property of a compressor do not decrease, the refrigerant oil is satisfactorily compatible with the refrigerant under low temperature conditions, and lubricity failure of a refrigerator or a compressor and heat exchange in an evaporator are sufficiently performed. Further, the kinematic viscosity at 100° C. is preferably 1 to 100 mm$^2$/s and more preferably 1 to 50 mm$^2$/s.

In the case of the ester-based refrigerant oil or the ether-based refrigerant oil in particular, carbon atoms and oxygen atoms can be representatively cited as atoms constituting the refrigerant oil. When the ratio of carbon atoms to oxygen atoms (carbon atoms/oxygen atoms molar ratio) is too small, moisture absorbance becomes high, and when it is too high, a problem of a decrease in compatibility with the refrigerant is caused. From this viewpoint, the ratio of carbon atoms to oxygen atoms, which are a base-oil component of the refrigerant oil, is suitably 2 to 7.5 by molar ratio.

Further, in the case of the hydrocarbon-based refrigerant oil, the working medium and the refrigerant oil are required to circulate together in the heat cycle system. The refrigerant oil being dissolved with the working medium is the most preferred embodiment, but, as long as a refrigerant oil enabling circulation of the refrigerant oil and the working medium in the heat cycle system is selected, a refrigerant oil with low solubility (for example, refrigerant oils disclosed in Japanese Patent No. 2803451) can be used as one component of the composition for a heat cycle system of the present invention. The refrigerant oil is required to have a low kinematic viscosity in order for the refrigerant oil to circulate in the heat cycle system. In the present invention, the kinematic viscosity of the hydrocarbon-based refrigerant oil is preferably 1 to 50 mm$^2$/s at 40° C., and particularly preferably 1 to 25 mm$^2$/s.

These refrigerant oils are preferably mixed with the working medium to be used as the composition for a heat cycle system. At this time, a mixing ratio of the refrigerant oil is preferably 5 to 60 mass % and more preferably 10 to 50 mass % with respect to the total amount of the composition for a heat cycle system.

(Ester-Based Refrigerant Oil)

As a base oil component of the ester-based refrigerant oil, in view of chemical stability, there can be cited a dibasic acid ester of a dibasic acid and a monohydric alcohol, a polyol ester of a polyol and a fatty acid, a complex ester of a polyol, a polybasic acid, and a monohydric alcohol (or a fatty acid), a polyol carbonate ester, and so on.

(Dibasic Acid Ester)

As the dibasic acid ester, esters of dibasic acids such as an oxalic acid, a malonic acid, a succinic acid, a glutaric acid, an adipic acid, a pimelic acid, a suberic acid, an azelaic acid, a sebacic acid, a phthalic acid, an isophthalic acid, and a terephthalic acid, particularly dibasic acids with 5 to 10 carbon atoms (such as a glutaric acid, an adipic acid, a pimelic acid, a suberic acid, an azelaic acid, and a sebacic acid) with monohydric alcohols with 1 to 15 carbon atoms having a linear or branched alkyl group (such as methanol, ethanol, propanol, butanol, pentanol, hexanol, heptanol, octanol, nonanol, decanol, undecanol, dodecanol, tridecanol, tetradecanol, and pentadecanol) are preferred. Concrete examples of this dibasic acid ester include glutaric acid ditridecyl, di(2-ethylhexyl) adipate, diisodecyl adipate, ditridecyl adipate, di(3-ethylhexyl) sebacate, and so on.

(Polyol Ester)

The polyol ester is an ester synthesized from a polyhydric alcohol (also referred to as a polyol) and a fatty acid (a carboxylic acid), and has a molar ratio of carbon atoms/oxygen atoms being 2.0 or more and 7.5 or less and preferably 3.2 or more and 5.8 or less.

As the polyhydric alcohol constituting the polyol ester, there can be cited diols (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol), and polyols having 3 to 20 hydroxy groups (such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (a dimer or trimer of glycerin), 1,3,5-pentanetriol, sorbitol, sorbitan, a sorbitol/glycerin condensate, polyhydric alcohols such as adonitol, arabitol, xylitol, and mannitol, saccharides such as xylose, arabinose, ribose, rhamnose, glucose, fructose, galactose, mannose, sorbose, cellobiose, maltose, isomaltose, trehalose, sucrose, raffinose, gentianose, and melezitose, a partially etherified product thereof, and so on), and the polyhydric alcohol constituting the ester may be one type of the above, or two or more types may be contained.

The number of carbon atoms in the fatty acid constituting the polyol ester is not particularly limited, but a fatty acid with 1 to 24 carbon atoms is ordinarily used. A linear fatty acid or a branched fatty acid is preferred. As the linear fatty acid, there can be cited an acetic acid, a propionic acid, a butanoic acid, a pentanoic acid, a hexanoic acid, a heptanoic acid, an octanoic acid, a nonanoic acid, a decanoic acid, an undecanoic acid, a dodecanoic acid, a tridecanoic acid, a tetradecanoic acid, a pentadecanoic acid, a hexadecanoic acid, a heptadecanoic acid, an octadecanoic acid, a nonadecanoic acid, an eicosanoic acid, an oleic acid, a linoleic acid, a linolenic acid, and so on, and a hydrocarbon group to be bonded to a carboxyl group may be all saturated hydrocarbon or may have an unsaturated hydrocarbon. Further, as the branched fatty acid, there can be cited 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, 2,2-diisopropylpropanoic acid, and so on. The fatty acid may be an ester of one type or two or more types of fatty acids selected from these.

The polyol constituting the ester may be one type, or a mixture of two or more types. Further, the fatty acid constituting the ester may be one type, or a mixture of two or more types. Further, the polyol ester may have a free hydroxyl group.

As the concrete polyol ester, esters of hindered alcohols such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol) are more preferred, esters of neopentyl glycol, trimethylolethane, trimethylolpropane, trimethylolbutane, pentaerythritol, and di-(pentaerythritol) are still more preferred, and esters of polyhydric alcohols such as neopentyl glycol, trimethylolpropane, pentaerythritol, and di-(pentaerythritol) and a fatty acid with 2 to 20 carbon atoms are preferred.

The fatty acid constituting such a polyhydric alcohol fatty acid ester may be only a fatty acid having a linear alkyl group or may be selected from fatty acids having a branched structure. Alternatively, the fatty acid may be a mixed ester of linear and branched fatty acids. Further, as the fatty acid constituting the ester, two or more types selected from the above-described fatty acids may be used.

As a concrete example, in the case of a mixed ester of linear and branched fatty acids, the molar ratio of a linear fatty acid with 4 to 6 carbon atoms to a branched fatty acid with 7 to 9 carbon atoms is 15:85 to 90:10, preferably 15:85 to 85:15, more preferably 20:80 to 80:20, further preferably 25:75 to 75:25, and most preferably 30:70 to 70:30. Further, the proportion of the total amount of the linear fatty acid with 4 to 6 carbon atoms and the branched fatty acid with 7 to 9 carbon atoms to the entire amount of the fatty acids constituting the polyhydric alcohol fatty acid ester is 20 mol % or more. The fatty acid composition should be selected considering achievement of both sufficient compatibility with the working medium and a viscosity required as the refrigerant oil. Incidentally, the proportion of the fatty acids mentioned here is a value based on the entire amount of the fatty acids constituting the polyhydric alcohol fatty acid ester contained in the refrigerant oil.

(Complex Ester)

The complex ester is an ester of a fatty acid and a dibasic acid and a monohydric alcohol and a polyol. For the fatty acid, the dibasic acid, the monohydric alcohol, and the polyol, the same as those described above can be used.

As the fatty acid, the ones exemplified as the fatty acids of the polyol ester described above can be cited.

As the dibasic acid, there can be cited an oxalic acid, a malonic acid, a succinic acid, a glutaric acid, an adipic acid, a pimelic acid, a suberic acid, an azelaic acid, a sebacic acid, a phthalic acid, an isophthalic acid, a terephthalic acid, and so on.

As the polyol, the ones exemplified as the polyhydric alcohols of the polyol ester described above can be cited. The complex ester is an ester of these fatty acid, dibasic acid, monohydric alcohol, and polyol, each of which may be a single component, or may be an ester composed of a plurality of components.

(Polyol Carbonate Ester)

The polyol carbonate ester is an ester of a carbonic acid and a polyol.

As the polyol, there can be cited polyglycols obtained by homopolymerizing or copolymerizing a diol (the same one as above) (such as a polyalkylene glycol, its ether compound, and modified compounds thereof), a polyol (the same one as above), one obtained by adding a polyglycol to a polyol, and so on.

As the polyalkylene glycol, the same ones as those to be exemplified as the polyalkylene glycol below can be used without any particular limitation, but there can be cited one obtained by a method of polymerizing an alkylene oxide with 2 to 4 carbon atoms (such as an ethylene oxide or a propylene oxide) using water or an alkali hydroxide as an initiator, or the like. Further, it may be one obtained by etherifying a hydroxyl group of a polyalkylene glycol. Oxyalkylene units in the polyalkylene glycol may be the same in one molecule, or two or more types of oxyalkylene units may be contained. At least oxypropylene units are preferably contained in one molecule. Further, the polyol carbonate ester may be a ring-opening polymer of a cyclic alkylene carbonate.

(Ether-Based Refrigerant Oil)

Examples of a base oil component of the ether-based refrigerant oil include polyvinyl ether, a polyalkylene glycol, and so on.

(Polyvinyl Ether)

Examples of the polyvinyl ether include one obtained by polymerizing a vinyl ether monomer, one obtained by copolymerizing a vinyl ether monomer and a hydrocarbon monomer having an olefinic double bond, and a copolymer of polyvinyl ether and an alkylene glycol or a polyalkylene glycol or a monoether thereof.

The carbon/oxygen molar ratio of the polyvinyl ether is 2.0 or more and 7.5 or less, and preferably 2.5 or more and 5.8 or less. When the carbon/oxygen molar ratio is less than this range, hygroscopicity increases, and when it exceeds this range, compatibility decreases. Further, a weight-average molecular weight of the polyvinyl ether is preferably 200 or more and 3000 or less, and more preferably 500 or more and 1500 or less. As for the kinematic viscosity at 40° C., the kinematic viscosity at 40° C. is preferably 1 to 750 mm²/s, and more preferably 1 to 400 mm²/s. Further, the kinematic viscosity at 100° C. is preferably 1 to 100 mm²/s, and more preferably 1 to 50 mm²/s.

Structure of Polyvinyl Ether

One type of the vinyl ether monomers may be used independently, or two or more types may be used in combination. As the hydrocarbon monomer having an olefinic double bond, there can be cited ethylene, propylene, various forms of butene, various forms of pentene, various forms of hexene, various forms of heptene, various forms of octene, diisobutylene, triisobutylene, styrene, α-methylstyrene, various forms of alkyl-substituted styrene, and so on. One type of the hydrocarbon monomers having an olefinic double bond may be used independently, or two or more types may be used in combination.

The polyvinyl ether copolymer may be either a block copolymer or a random copolymer. One type of the polyvinyl ether may be used independently, or two or more types may be used in combination.

The polyvinyl ether to be used preferably has structural units represented by the following general formula (1).

[Chemical formula 1]

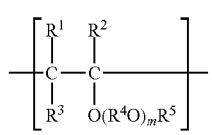

(1)

(where $R^1$, $R^2$ and $R^3$ may be the same as or different from one another and each represent a hydrogen atom or a hydrocarbon group with 1 to 8 carbon atoms, $R^4$ represents a bivalent hydrocarbon group with 1 to 10 carbon atoms or an ether bond oxygen-containing divalent hydrocarbon group with 2 to 20 carbon atoms, $R^5$ represents a hydrocarbon group with 1 to 20 carbon atoms, m represents a number such that an average value of m in the polyvinyl ether is 0 to 10, $R^1$ to $R^5$ may be the same or different in each of the structural units, and when m represents 2 or more in one structural unit, a plurality of $R^4O$ may be the same or different.)

In the above-described general formula (1), at least one of $R^1$, $R^2$ and $R^3$ is preferably a hydrogen atom, and all thereof are particularly preferably a hydrogen atom. In the general formula (1), m is 0 or more and 10 or less, particularly 0 or more and 5 or less, and preferably 0. In the general formula (1), $R^5$ represents a hydrocarbon group with 1 to 20 carbon atoms. Concrete examples of this hydrocarbon group include alkyl groups such as a methyl group, an ethyl group, a n-propyl group, an isopropyl group, a n-butyl group, an isobutyl group, a sec-butyl group, a tert-butyl group, various forms of a pentyl group, various forms of a hexyl group, various forms of a heptyl group, and various forms of an octyl group, cycloalkyl groups such as a cyclopentyl group, a cyclohexyl group, various forms of a methylcyclohexyl group, various forms of an ethylcyclohexyl group, and various forms of a dimethylcyclohexyl group, aryl groups such as a phenyl group, various forms of a methylphenyl group, various forms of an ethylphenyl group, and various forms of a dimethylphenyl group, and arylalkyl groups such as a benzyl group, various forms of a phenylethyl group, and various forms of a methylbenzyl group, and an alkyl group, particularly an alkyl group with 1 or more and 5 or less carbon atoms is preferred.

The polyvinyl ether in this embodiment may be a homopolymer constituted by one type of the structural units represented by the general formula (1) or a copolymer constituted by 2 or more types of the structural units. The copolymer may be either a block copolymer or a random copolymer.

The polyvinyl ether in this embodiment may be one constituted by only the structural units represented by the above general formula (1), but may be a copolymer further including structural units represented by the following general formula (2). In this case, the copolymer may be either a block copolymer or a random copolymer.

[Chemical formula 2]

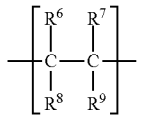

(2)

(where $R^6$ to $R^9$ may be the same as or different from one another and each represent a hydrogen atom or a hydrocarbon group with 1 to 20 carbon atoms.)

(Poly Vinyl Ether Monomer)

As the vinyl ether monomer, a compound represented by the following general formula (3) can be cited.

[Chemical formula 3]

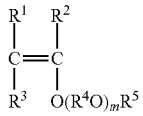

(3)

(where $R^1$, $R^2$, $R^3$, $R^4$, $R^5$, and m represent the same meaning as in $R^1$, $R^2$, $R^3$, $R^4$, $R^5$ and m in the general formula (1) respectively.)

There are various vinyl ether monomers corresponding to the above-described polyvinyl ether, and for example, there can be cited vinyl methyl ether; vinyl ethyl ether; vinyl-n-propyl ether; vinyl-isopropyl ether; vinyl-n-butyl ether; vinyl-isobutyl ether; vinyl-sec-butyl ether; vinyl tert-butyl ether; vinyl-n-pentyl ether; vinyl-n-hexyl ether; vinyl-2-methoxyethyl ether; vinyl-2-ethoxyethyl ether; vinyl-2-methoxy-1-methylethyl ether; vinyl-2-methoxy-propyl ether; vinyl-3,6-dioxaheptyl ether; vinyl-3,6,9-trioxadecyl ether; vinyl-1,4-dimethyl-3,6-dioxaheptyl ether; vinyl-1,4,7-trimethyl-3,6,9-trioxadecyl ether; vinyl-2,6-dioxa-4-heptyl ether; vinyl-2,6,9-trioxa-4-decyl ether; 1-methoxypropene; 1-ethoxypropene; 1-n-propoxypropene; 1-isopropoxypropene; 1-n-butoxypropene; 1-isobutoxypropene; 1-sec-butoxypropene; 1-tert-butoxypropene; 2-methoxypropene; 2-ethoxypropene; 2-n-propoxypropene; 2-isopropoxypropene; 2-n-butoxypropene; 2-isobutoxypropene; 2-sec-butoxypropene; 2-tert-butoxypropene; 1-methoxy-1-butene; 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene; 2-n-propoxy-1-butene; 2-isopropoxy-1-butene; 2-n-butoxy-1-butene; 2-isobutoxy-1-butene; 2-sec-butoxy-1-butene; 2-tert-butoxy-1-butene; 2-methoxy-2-butene; 2-ethoxy-2-butene; 2-n-propoxy-2-butene; 2-isopropoxy-2-butene; 2-n-butoxy-2-butene; 2-isobutoxy-2-butene; 2-sec-butoxy-2-butene; 2-tert-butoxy-2-butene, and so on. These vinyl ether monomers can be produced by a publicly-known method.

Terminal of Polyvinyl Ether

The terminal of the polyvinyl ether having the structural units represented by the above general formula (1) to be used as a base oil component of the refrigerant oil for the composition for a heat cycle system of the present invention can be converted to a desired structure by the method disclosed in Examples or by a publicly-known method. Examples of the group to which the terminal is to be converted include a saturated hydrocarbon, ether, alcohol, ketone, amide, nitrille, and so on.

The polyvinyl ether to be used as the base oil component of the refrigerant oil for the composition for a heat cycle system of the present invention is suitably one having a terminal structure represented by any of the following general formulae (4) to (8).

[Chemical formula 4]

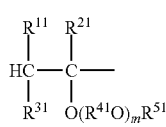

(4)

(where $R^{11}$, $R^{21}$, and $R^{31}$ may be the same as or different from one another and each represent a hydrogen atom or a hydrocarbon group with 1 to 8 carbon atoms, $R^{41}$ represents a divalent hydrocarbon group with 1 to 10 carbon atoms or an ether bond oxygen-containing divalent hydrocarbon group with 2 to 20 carbon atoms, $R^{51}$ represents a hydrocarbon group with 1 to 20 carbon atoms, m represents a number such that an average value of m in the polyvinyl ether is 0 to 10, and when m represents 2 or more, a plurality of $R^{41}O$ may be the same or different.)

[Chemical formula 5]

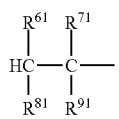

(5)

(where $R^{61}$, $R^{71}$, $R^{81}$, and $R^{91}$ may be the same as or different from one another and each represent a hydrogen atom or a hydrocarbon group with 1 to 20 carbon atoms.)

[Chemical formula 6]

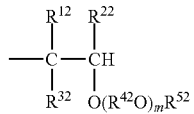

(6)

(where $R^{12}$, $R^{22}$, and $R^{32}$ may be the same as or different from one another and each represent a hydrogen atom or a hydrocarbon group with 1 to 8 carbon atoms, $R^{42}$ represents a divalent hydrocarbon group with 1 to 10 carbon atoms or an ether bond oxygen-containing divalent hydrocarbon group with 2 to 20 carbon atoms, $R^{52}$ represents a hydrocarbon group with 1 to 20 carbon atoms, m represents a number such that an average value of m in the polyvinyl ether is 0 to 10, and when m represents 2 or more, a plurality of $R^{42}O$ may be the same or different.)

[Chemical formula 7]

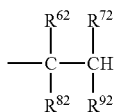
(7)

(where $R^{62}$, $R^{72}$, $R^{82}$, and $R^{92}$ may be the same as or different from one another and each represent a hydrogen atom or a hydrocarbon group with 1 to 20 carbon atoms.)

[Chemical formula 8]

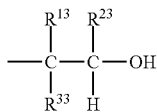
(8)

(where $R^{13}$, $R^{23}$, and $R^{33}$ may be the same as or different from one another and each represent a hydrogen atom or a hydrocarbon group with 1 to 8 carbon atoms.)

(Producing Method of Polyvinyl Ether)

The polyvinyl ether in this embodiment can be produced by subjecting the above-described monomer to radical polymerization, cation polymerization, radiation polymerization, or the like. After completion of polymerization reaction, an ordinary separation/purification method is performed as necessary, and thereby an intended polyvinyl ether compound having the structural units represented by the general formula (1) is obtained.

(Polyalkylene Glycol)

As the polyalkylene glycol, there can be cited one obtained by a method of polymerizing an alkylene oxide with 2 to 4 carbon atoms (such as an ethylene oxide or a propylene oxide) using water or an alkali hydroxide as an initiator, or the like. Further, it may be one obtained by etherifying a hydroxyl group of the polyalkylene glycol. Oxyalkylene units in the polyalkylene glycol may be the same in one molecule or two or more types of oxyalkylene units may be contained. At least oxypropylene units are preferably contained in one molecule.

Concrete examples of the polyalkylene glycol include a compound represented by the following general formula (9), for example.

(9)

(where $R^{101}$ represents a hydrogen atom, an alkyl group with 1 to 10 carbon atoms, an acyl group with 2 to 10 carbon atoms, or an aliphatic hydrocarbon group with 1 to 10 carbon atoms having 2 to 6 binding sites, $R^{102}$ represents an alkylene group with 2 to 4 carbon atoms, $R^{103}$ represents a hydrogen atom, an alkyl group with 1 to 10 carbon atoms, or an acyl group with 2 to 10 carbon atoms, l represents an integer of 1 to 6 or less, and k represents a number such that an average value of k×l is 6 to 80.)

In the above-described general formula (9), the alkyl group in $R^{101}$ and $R^{103}$ may be linear, branched or cyclic. Concrete examples of the alkyl group include a methyl group, an ethyl group, a n-propyl group, an isopropyl group, various forms of a butyl group, various forms of a pentyl group, various forms of a hexyl group, various forms of a heptyl group, various forms of an octyl group, various forms of a nonyl group, various forms of a decyl group, a cyclopentyl group, a cyclohexyl group, and so on. When the number of carbon atoms in the alkyl group exceeds 10, the compatibility with the refrigerant sometimes decreases, thus leading to phase separation. The number of carbon atoms in the alkyl group is preferably 1 to 6.

Further, the alkyl group moiety in the acyl group in $R^{101}$ and $R^{103}$ may be linear, branched or cyclic. Concrete examples of the alkyl group moiety in the acyl group include various groups with 1 to 9 carbon atoms similarly to the concrete examples of the above-described alkyl group. When the number of carbon atoms in the acyl group exceeds 10, the compatibility with the refrigerant sometimes decreases, thus leading to phase separation. The number of carbon atoms in the acyl group is preferably 2 to 6.

In the case where $R^{101}$ and $R^{103}$ both are an alkyl group or an acyl group, $R^{101}$ and $R^{103}$ may be the same as or different from each other.

Further, in the case of l being 2 or more, the plurality of $R^{103}$ in one molecule may be the same as or different from each other.

In the case of $R^{101}$ being an aliphatic hydrocarbon group with 1 to 10 carbon atoms having 2 to 6 binding sites, the aliphatic hydrocarbon group may be a chain group or a cyclic group. Examples of the aliphatic hydrocarbon group having two binding sites include an ethylene group, a propylene group, a butylene group, a pentylene group, a hexylene group, a heptylene group, an octylene group, a nonylene group, a decylene group, a cyclopentylene group, a cyclohexylene group, and so on. Further, examples of an aliphatic hydrocarbon group having 3 to 6 binding sites include trimethylolpropane, glycerin, pentaerythritol, sorbitol; 1,2,3-trihydroxycyclohexane; and a residue having a hydroxyl group removed from a polyhydric alcohol such as 1,3,5-trihydroxycyclohexane.

When the number of carbon atoms of the aliphatic hydrocarbon group exceeds 10, the compatibility with the working medium sometimes decreases, thus leading to phase separation. The number of carbon atoms is preferably 2 to 6.

In the above-described general formula (9), $R^{102}$ is an alkylene group with 2 to 4 carbon atoms, and as an oxyalkylene group of a repeating unit, an oxyethylene group, an oxypropylene group, an oxybutylene group can be cited. Oxyalkylene groups in one molecule may be the same, and two or more types of oxyalkylene groups may be contained, but one containing at least oxypropylene units in one molecule is preferred, and particularly, one containing 50 mol % or more of oxypropylene units in the oxyalkylene unit is suitable.

In the above-described general formula (9), l is an integer of 1 to 6 and is determined depending on the number of binding sites of $R^{101}$. For example, in the case of $R^{101}$ being an alkyl group or an acyl group, l is 1, and in the case of $R^{101}$ being an aliphatic hydrocarbon group having 2, 3, 4, 5 or 6 binding sites, l is 2, 3, 4, 5 or 6. Further, k is a number such that an average value of k×l is 6 to 80, and when the average value of k×l deviates from the above range, the object of the present invention cannot be accomplished sufficiently.

As the structure of the polyalkylene glycol, polypropylene glycol dimethyl ether represented by the following general formula (10) and polyethylene polypropylene glycol dimethyl ether represented by the following general formula (11) are suitable in view of economic efficiency and the above-described effects, and further, polypropylene glycol monobutyl ether represented by the following general formula (12), polypropylene glycol monomethyl ether represented by the following general formula (13), polyethylene polypropylene glycol monomethyl ether represented by the following general formula (14), polyethylene polypropylene glycol monobutyl ether represented by the following general formula (15), and polypropylene glycol diacetate represented by the following general formula (16) are suitable in view of economic efficiency, and the like.

  (10)

(where h represents a number of 6 to 80.)

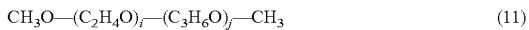  (11)

(where i and j each are 1 or more and the sum of i and j represents a number of 6 to 80.)

  (12)

(where h represents a number of 6 to 80.)

  (13)

(where h represents a number of 6 to 80).

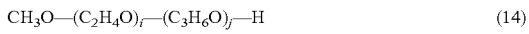  (14)

(where i and j each are 1 or more and the sum of i and j represents a number of 6 to 80.)

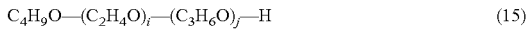  (15)

(where i and j each are 1 or more and the sum of i and j represents a number of 6 to 80.)

  (16)

(where h represents a number of 6 to 80).

One type of polyoxyalkylene glycols may be used independently, or two or more types may be used in combination.

The kinematic viscosity of the polyalkylene glycol at 40° C. represented by the above-described general formula (9) is preferably 1 to 750 mm$^2$/s, and more preferably 1 to 400 mm$^2$/s. Further, the kinematic viscosity at 100° C. is preferably 1 to 100 mm$^2$/s, and more preferably 1 to 50 mm$^2$/s.

<Hydrocarbon-Based Refrigerant Oil>

As a base oil component of the hydrocarbon-based refrigerant oil, alkyl benzene can be used.

As the alkyl benzene, branched alkyl benzene resulting from synthesis of a polymer of propylene and benzene as materials using a catalyst such as hydrogen fluoride, or linear alkyl benzene resulting from synthesis of normal paraffin and benzene as materials using the same catalyst can be used. The number of carbon atoms in the alkyl group is preferably 1 to 30 and more preferably 4 to 20 from the viewpoint of making the viscosity as a base oil component of the refrigerant oil suitable. Further, the number of alkyl groups in one molecule of the alkyl benzene is preferably 1 to 4 and more preferably 1 to 3 so as to make the viscosity fall within a set range depending on the number of carbon atoms in the alkyl group.

Further, the refrigerant oil is required to circulate in the heat cycle system with the working medium. The refrigerant oil being dissolved with the working medium is the most preferred embodiment, but, as long as a refrigerant oil enabling circulation of the refrigerant oil and the working medium in the heat cycle system is selected, a refrigerant oil with low solubility can be used as a refrigerant oil composition of the present invention. The refrigerant oil is required to have a low kinematic viscosity in order for the refrigerant oil to circulate in the heat cycle system. In the present invention, the kinematic viscosity of the alkyl benzene at 40° C. is preferably 1 to 100 mm$^2$/s, and particularly preferably 1 to 50 mm$^2$/s.

One type of these refrigerant oils may be used independently, or two or more types may be used in combination.

The content of the refrigerant oil in the composition for a heat cycle system only needs to fall within a range not significantly decreasing the effects of the present invention, and is preferably 10 to 100 parts by mass and more preferably 20 to 50 parts by mass with respect to 100 parts by mass of the working medium.

<Mineral Refrigerant Oil>

As the mineral refrigerant oil, the naphthenic refrigerant oil having good compatibility with the working medium out of the paraffinic refrigerant oil and the naphthenic refrigerant oil is preferably used.

As a base-oil component of the naphthenic refrigerant oil, it is a hydrocarbon containing at least one saturated ring (naphthene ring) in one molecule, and is a ring compound mainly composed of cyclopentane with five carbon atoms and cyclohexane with six carbon atoms, and a naphthenic base oil made by refining a lubricating oil distillate obtained by subjecting a naphthenic crude to atmospheric distillation or vacuum distillation appropriately combined with refining treatments such as solvent deasphalting, solvent extraction, hydrogenolysis, solvent dewaxing, catalytic dewaxing, hydrogenation refining, and clay treatment, or the like can be used.

Further, the refrigerant oil is required to circulate in the heat cycle system with the working medium. The refrigerant oil being dissolved with the working medium is the most preferred embodiment, but, as long as a refrigerant oil enabling circulation of the refrigerant oil and the working medium in the heat cycle system is selected, a refrigerant oil with low solubility can be used as the refrigerant oil composition of the present invention. The refrigerant oil is required to have a low kinematic viscosity in order for the refrigerant oil to circulate in the heat cycle system. In the present invention, the kinematic viscosity of the naphthenic refrigerant oil at 40° C. is preferably 1 to 300 mm$^2$/s, and particularly preferably 1 to 100 mm$^2$/s.

One type of these refrigerant oils may be used independently, or two or more types may be used in combination.

The content of the refrigerant oil in the composition for a heat cycle system only needs to fall within a range not significantly decreasing the effects of the present invention, and is preferably 10 to 100 parts by mass and more preferably 20 to 50 parts by mass with respect to 100 parts by mass of the working medium.

<Other Optional Component>

The composition for a heat cycle system can contain a publicly-known optional component additionally within a range not impairing the effects of the present invention. As such an optional component, for example, a leak detecting substance can be cited, and examples of this leak detecting substance to be contained optionally include an ultraviolet fluorescent dye, an odor gas, an odor masking agent, and so on.

Examples of the ultraviolet fluorescence dye include publicly-known ultraviolet fluorescence dyes used for the heat cycle system together with the working medium composed of a halogenated hydrocarbon conventionally, such as those disclosed in U.S. Pat. No. 4,249,412, Japanese Translation of PCT International Application Publication No. H10-502737, Japanese Translation of PCT International Application Publication No. 2007-511645, Japanese Translation of PCT International Application Publication No. 2008-500437, and Japanese Translation of PCT International Application Publication No. 2008-531836.

Examples of the odor masking agent include publicly-known aroma chemicals to be used for the heat cycle system together with the working medium composed of a halogenated hydrocarbon conventionally, such as those disclosed in Japanese Translation of PCT International Application Publication No. 2008-500437 and Japanese Translation of PCT International Application Publication No. 2008-531836.

In the case of using the leak detecting substance, a solubilizing agent for improving solubility of the leak detecting substance to the working medium may be used.

Examples of the solubilizing agent include those disclosed in Japanese Translation of PCT International Application Publication No. 2007-511645, Japanese Translation of PCT International Application Publication No. 2008-500437, and Japanese Translation of PCT International Application Publication No. 2008-531836.

The content of the leak detecting substance in the composition for a heat cycle system only needs to fall within a range not significantly decreasing the effects of the present invention, and is preferably 2 parts by mass or less and more preferably 0.5 parts by mass or less with respect to 100 parts by mass of the working medium.

[Heat Cycle System]

The heat cycle system of the present invention is a system using the composition for a heat cycle system of the present invention. The heat cycle system of the present invention may be a heat pump system utilizing heat obtained by a condenser or may be a refrigeration cycle system utilizing coldness obtained by an evaporator.

As the heat cycle system of the present invention, concretely, there can be cited a refrigerating apparatus, an air-conditioning apparatus, a power generation system, a heat transport apparatus, a secondary cooling machine, and so on. Among them, the heat cycle system of the present invention is preferably used as an air-conditioning apparatus to be often disposed outdoors or the like due to being able to efficiently exhibit heat cycle performance even in a high-temperature working environment. Further, the heat cycle system of the present invention is preferably used also as a refrigerating apparatus.

As the power generation system, a power generation system by Rankine cycle system is preferred.

As the power generation system, concretely, there can be cited as an example a system in which in an evaporator, a working medium is heated by geothermal energy, solar heat, waste heat in a medium-to-high temperature range at about 50 to 200° C., or the like, the vaporized working medium in a high temperature and high pressure state is adiabatically expanded by an expansion device, and a power generator is driven by the work generated by the adiabatic expansion to thereby perform power generation.

Further, the heat cycle system of the present invention may be a heat transport apparatus. As the heat transport apparatus, a latent heat transport apparatus is preferred.

As the latent heat transport apparatus, there can be cited a heat pipe conducting latent heat transport utilizing a phenomenon such as evaporation, boiling, or condensation of a working medium filled in an apparatus and a two-phase closed thermosiphon apparatus. The heat pipe is applied to a relatively small-sized cooling apparatus such as a cooling apparatus of a heat generation part of a semiconductor element and electronic equipment. The two-phase closed thermosiphon apparatus is widely utilized for a gas/gas heat exchanger, accelerating snow melting and preventing freezing of roads, and the like because it does not require a wick and its structure is simple.

Concrete examples of the refrigerating apparatus include showcases (such as a built-in showcase and a separate showcase), an industrial fridge-freezer, a vending machine, an ice making machine, and so on.

Concrete examples of the air-conditioning apparatus include a room air-conditioner, packaged air-conditioners (such as a store packaged air-conditioner, a building packaged air-conditioner, and a plant packaged air-conditioner), a heat source equipment chilling unit, a gas engine heat pump, a train air-conditioning system, an automobile air-conditioning system, and so on.

As the heat source equipment chilling unit, there can be cited, for example, a volume compression refrigerator and a centrifugal refrigerator. The centrifugal refrigerator to be explained next is preferred because it has a large amount of the working medium to be filled, therefore making it possible to obtain the effects of the present invention more significantly.

Here, the centrifugal refrigerator is a refrigerator using a centrifugal compressor. The centrifugal refrigerator is one type of a vapor compression refrigerator, and is also called a turbo refrigerator ordinarily. The centrifugal compressor includes an impeller, and performs compression by the rotating impeller discharging a working medium to an outer peripheral portion. The centrifugal refrigerator is used in a semiconductor factory, a cold water producing plant in the petrochemical industry, and the like in addition to an office building, district cooling and heating, and cooling and heating in a hospital.

The centrifugal refrigerator may be either a low-pressure centrifugal refrigerator or a high-pressure centrifugal refrigerator, but is preferred to be a low-pressure centrifugal refrigerator. Incidentally, the low-pressure centrifugal refrigerator is a centrifugal refrigerator using a working medium to which High Pressure Gas Safety Act is not applied such as, for example, CFC-11, HCFC-123, or HFC-245fa, namely a working medium that does not apply to a "liquefied gas that has a pressure to be 0.2 MPa or more at its normal operating temperature and whose pressure is currently 0.2 MPa or more, or a liquefied gas whose temperature is 35° C. or less in the case of the pressure being 0.2 MPa or more."

Hereinafter, as one example of the heat cycle system of an embodiment of the present invention, there will be explained the refrigeration cycle system by using a refrigeration cycle system 10 whose outline has been explained above and whose schematic configuration diagram is illustrated in FIG. 1 as an example. The refrigeration cycle system is a system utilizing coldness obtained by an evaporator.

The refrigeration cycle system 10 illustrated in FIG. 1 is a system schematically configured by including: a compressor 11 that compresses a working medium vapor A to make it into a working medium vapor B at high temperature and high pressure; a condenser 12 that cools and liquefies the working medium vapor B emitted from the compressor 11 to make it into a working medium C at low temperature and high pressure; an expansion valve 13 that expands the working medium C emitted from the condenser 12 to make it into a working medium D at low temperature and low pressure; an evaporator 14 that heats the working medium D emitted from the expansion valve 13 to make it into the working medium vapor A at high temperature and low pressure; a pump 15 that supplies a load fluid E to the evaporator 14; and a pump 16 that supplies a fluid F to the condenser 12.

In the refrigeration cycle system 10, (i) to (iv) cycles below are repeated.

(i) Compressing the working medium vapor A emitted from the evaporator 14 in the compressor 11 to make it into the working medium vapor B at high temperature and high pressure (to be hereinafter referred to as an "AB process").

(ii) Cooling and liquefying the working medium vapor B emitted from the compressor 11 by the fluid F in the condenser 12 to make it into the working medium C at low temperature and high pressure. In this event, the fluid F is heated to be made into a fluid F' and emitted from the condenser 12 (to be hereinafter referred to as a "BC process").

(iii) Expanding the working medium C emitted from the condenser 12 in the expansion valve 13 to make it into the working medium D at low temperature and low pressure (to be hereinafter referred to as a "CD process").

(iv) Heating the working medium D emitted from the expansion valve 13 by the load fluid E in the evaporator 14 to make it into the working medium vapor A at high temperature and low pressure. In this event, the load fluid E is cooled to be made into a load fluid E' and emitted from the evaporator 14 (to be hereinafter referred to as a "DA process").

The refrigeration cycle system 10 is a cycle system achieved by an adiabatic and isentropic change, an isenthalpic change, and an isobaric change. The change of state of the working medium can be expressed as a trapezoid having A, B, C, and D as vertices when the change is illustrated on the pressure-enthalpy line (curve) diagram illustrated in FIG. 2.

Figure 2:
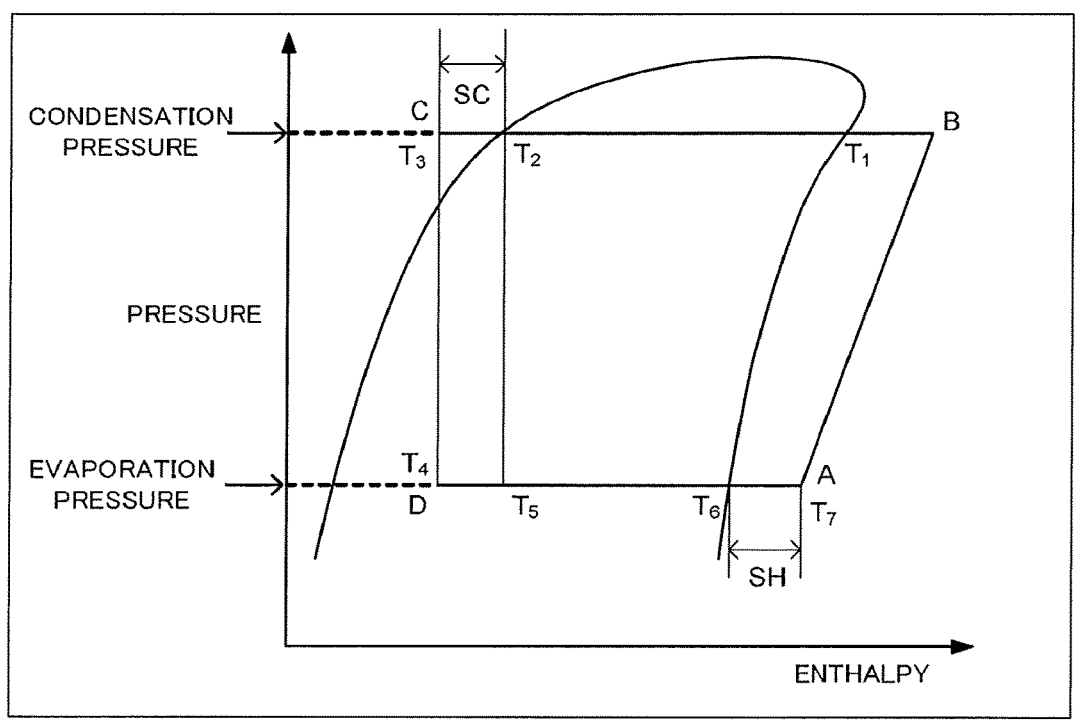
FIG. 2 is a cycle chart illustrating change of state of a working medium in the refrigeration cycle system in FIG. 1 on a pressure-enthalpy line diagram.

The AB process is a process of performing adiabatic compression in the compressor 11 to make the working medium vapor A at high temperature and low pressure into the working medium vapor B at high temperature and high pressure, and is indicated by an AB line in FIG. 2.

The BC process is a process of performing isobaric cooling in the condenser 12 to make the working medium vapor B at high temperature and high pressure into the working medium C at low temperature and high pressure, and is indicated by a BC line in FIG. 2. The pressure in this event is the condensation pressure. An intersection point $T_1$ on a high enthalpy side of intersection points of the pressure-enthalpy line and the BC line is a condensation temperature, and an intersection point $T_2$ on a low enthalpy side is a condensation boiling temperature. Here, the temperature glide in the case where HCFO-1224yd is a medium mixed with another working medium and is a non-azeotropic mixed medium is represented by the difference between $T_1$ and $T_2$.

The CD process is a process of performing isenthalpic expansion in the expansion valve 13 to make the working medium C at low temperature and high pressure into the working medium D at low temperature and low pressure, and is indicated by a CD line in FIG. 2. Incidentally, when the temperature of the working medium C at low temperature and high pressure is indicated by a temperature $T_3$, $T_2$-$T_3$ is a degree of supercooling of the working medium (to be hereinafter referred to as "SC" as necessary) in the cycles of (i) to (iv).

The DA process is a process of performing isobaric heating in the evaporator 14 to return the working medium D at low temperature and low pressure to the working medium vapor A at high temperature and low pressure, and is indicated by a DA line in FIG. 2. The pressure in this event is the evaporation pressure. An intersection point $T_6$ on a high enthalpy side of intersection points of the pressure-enthalpy line and the DA line is an evaporation temperature. When the temperature of the working medium vapor A is indicated by a temperature $T_7$, $T_7$-$T_6$ is a degree of superheating of the working medium (to be referred to as "SH" as necessary) in the cycles of (i) to (iv). Incidentally, $T_4$ indicates the temperature of the working medium D.

Here, cycle performance of the working medium can be evaluated, for example, by refrigerating capacity (to be hereinafter referred to as "Q" as necessary) and coefficient of performance (to be hereinafter referred to as "COP" as necessary) of the working medium. Q and COP of the working medium are obtained by the following formulae (A) and (B) respectively by using enthalpies $h_A$, $h_B$, $h_C$, and $h_D$ in respective states of A (after evaporation, high temperature and low pressure), B (after compression, high temperature and high pressure), C (after condensation, low temperature and high pressure), and D (after expansion, low temperature and low pressure) of the working medium.

$$Q = h_A - h_D \tag{A}$$

$$COP = Q/\text{compression work} = (h_A - h_D)/(h_B - h_A) \tag{B}$$

Incidentally, COP means the efficiency in the refrigeration cycle system, and a higher COP indicates that a higher output, for example, Q can be obtained by a smaller input, for example, electric energy required to operate a compressor.

In the meantime, Q means the capacity of refrigerating the load fluid, and a higher Q means that the same system can perform a larger amount of work. In other words, having a high Q indicates that target performance can be obtained by a small amount of the working medium, thus enabling downsizing of the system.

According to the heat cycle system of the present invention using the composition for a heat cycle system of the present invention, as compared with the case of using HFC-134a, which has been generally used for an air-conditioning apparatus or the like up to now, in the refrigeration cycle system 10 illustrated in FIG. 1, for example, it is possible to set both Q and COP to a high level, namely a level equal to or higher than that of HFC-134a, while remarkably suppressing the global warming potential.

Further, it is also possible to make a composition that suppresses the temperature glide of the working medium contained in the composition for a heat cycle system to be used to a certain value or lower, and in this case, the composition change when the composition for a heat cycle system is put into a refrigerating and air-conditioning apparatus from a pressure container and the change in refrigerant composition in the refrigerating and air-conditioning apparatus when the refrigerant leaks out from the refrigerating and air-conditioning apparatus can be suppressed to lower levels. Further, according to the composition for a heat cycle system of the present invention, it is possible to improve the stability of HCFO-1224yd contained in the working medium, which is contained in the composition for a heat cycle system, and therefore, in the heat cycle system using the composition, the working medium can be used longer than ever before and long-term stable operation is enabled.

Incidentally, at the time of operation of the heat cycle system, in order to prevent occurrence of failure due to mixture of moisture and mixture of noncondensing gas such as oxygen, it is preferred to provide a means for suppressing the mixture of them.

The case of moisture to be mixed into the heat cycle system may cause problems when the heat cycle system is used particularly at low temperature. For example, problems such as freezing in a capillary tune, hydrolysis of the working medium and the refrigerant oil, deterioration of material due to acid components generated in the cycle, and generation of contaminants occur. In particular, when the refrigerant oil is a polyalkylene glycol, a polyol ester, or the like, the refrigerant oil is extremely high in hygroscopicity, is likely to cause a hydrolysis reaction, and decreases in characteristics as the refrigerant oil, resulting in a major cause to lose the long-term reliability of the compressor. Accordingly, to suppress the hydrolysis of the refrigerant oil, it is necessary to control the moisture concentration in the heat cycle system.

Examples of a method of controlling the moisture concentration in the heat cycle system include a method of using a moisture removing means such as a drying agent (silica gel, activated alumina, zeolite, or the like), or the like. Bringing the drying agent into contact with a liquid composition for a heat cycle system is preferred in terms of dehydration efficiency. For example, the drying agent is preferably placed at an outlet of the condenser 12 or an inlet of the evaporator 14 to bring the drying agent into contact with the composition for heat cycle system.

As the drying agent, a zeolite-based drying agent is preferred in terms of chemical reactivity between the drying agent and the composition for a heat cycle system and hygroscopic capacity of the drying agent.

As the zeolite-based drying agent, a zeolite-based drying agent containing a compound expressed by the following formula (C) as a main component is preferred in terms of being excellent in hygroscopic capacity in the case of using a refrigerant oil higher in moisture absorption amount than a conventional mineral refrigerant oil.

$$M_{2/n}O \cdot Al_2O_3 \cdot xSiO_2 \cdot yH_2O \qquad (C)$$

where M is an element of Group 1 such as Na or K or an element of Group 2 such as Ca, n is a valence of M, and x, y are values determined by a crystal structure. By changing M, a pore diameter can be adjusted.

In selecting the drying agent, a pore diameter and a breaking strength are important. In the case of using a drying agent having a pore diameter larger than a molecular diameter of the working medium and the stabilizer contained in the composition for a heat cycle system, the working medium and the stabilizer are absorbed into the drying agent, and as a result, a chemical reaction occurs between the working medium and the stabilizer and the drying agent, thereby causing unfavorable phenomena such as generation of noncondensing gas, a decrease in strength of the drying agent, and a decrease in absorption capacity.

Accordingly, as the drying agent, it is preferred to use a zeolite-based drying agent having a small pore diameter. In particular, a sodium-potassium A type synthetic zeolite having a pore diameter of 3.5 angstrom or less is preferred. Applying the sodium-potassium A type synthetic zeolite having a pore diameter smaller than the molecular diameter of the working medium and the stabilizer makes it possible to selectively absorb and remove only moisture in the heat cycle system without absorbing the working medium and the stabilizer. In other words, since the absorption of the working medium and the stabilizer to the drying agent is unlikely occur, thermal decomposition becomes less likely to occur, thereby making it possible to suppress deterioration of the material forming the heat cycle system and occurrence of contaminants.

The size of the zeolite-based drying agent is preferably about 0.5 to 5 mm because the zeolite-based drying agent having a too-small size causes clogging of a valve or a pipe small portion in the heat cycle system, whereas the zeolite-based drying agent having a too-large size decreases the drying ability. The shape is preferably granular or cylindrical.

The zeolite-based drying agent can be made into an arbitrary shape by solidifying powdery zeolite with a binder (bentonite or the like). As long as the zeolite-based drying agent is used as a main body, another drying agent (silica gel, activated alumina, or the like) may be used together.

The use ratio of the zeolite-based drying agent to the composition for a heat cycle system is not particularly limited.

Further, the noncondensing gas, when entering the inside of the heat cycle system, has adverse effects such as failure of thermal transfer in the condenser and the evaporator and an increase in working pressure, and therefore the mixture of the noncondensing gas needs to be suppressed as much as possible. In particular, oxygen being one noncondensing gas reacts with the working medium and the refrigerant oil to promote decomposition.

The concentration of the noncondensing gas is preferably 1.5 volume % or less and particularly preferably 0.5 volume % or less by volume percent with respect to the working medium in a gas phase part of the working medium.

According to the above-described heat cycle system of the present invention, use of the composition for a heat cycle system of the present invention makes it possible to achieve high stability and obtain practically sufficient cycle performance while suppressing an effect on global warming, and causes substantially no problems related to the temperature glide.

[Example]

Hereinafter, the present invention will be explained in further detail with reference to Examples (Examples 1 to 46, Examples 67 to 86, Examples 92 to 131, Examples 152 to 191, Examples 212 to 251, Examples 272 to 311, Examples 332 to 355) and Comparative examples (Examples 47 to 66, Examples 87 to 91, Examples 132 to 151, Examples 192 to 211, Examples 252 to 271, Examples 312 to 331, Examples 356 to 367). In Examples, compositions for a heat cycle system were produced by mixing components by mixture (mass %) illustrated in Tables 4 to 29.

Here, the following stabilizers and refrigerant oils were used. Incidentally, as for the working medium, the content proportion of each medium in the working medium is illustrated in Tables 2, 3.

Stabilizer 1: 2,6-di-tert-butyl-4-methylphenol
Stabilizer 2: 1,4-benzoquinone
Stabilizer 3: phenothiazine
Stabilizer 4: 3-methoxyphenol
Refrigerant oil 1 (refrigerant oil containing a polyol ester as its main component): a pentaerythritol octanoic acid nonanoic acid ester with a carbon/oxygen molar ratio of 4.8 and a kinematic viscosity at 40° C. of 68 mm²/s
Refrigerant oil 2 (refrigerant oil containing polyvinyl ether as its main component): a copolymer of ethyl vinyl ether and isobutyl vinyl ether with a molar ratio of ethyl vinyl ether to isobutyl vinyl ether of 7/1, a carbon/oxygen molar ratio of 4.3, and a kinematic viscosity at 40° C. of 68 mm²/s
Refrigerant oil 3 (refrigerant containing a polyalkylene glycol as its main component): a compound having both terminals of polypropylene glycol methyl-etherified with a carbon/oxygen molar ratio of 2.7
Refrigerant oil 4 (refrigerant oil containing alkyl benzene as its main component): alkyl benzene (a mixture of alkyl benzene with 10 to 13 carbon atoms and alkyl benzene with 14 to 30 carbon atoms with a kinematic viscosity at 40° C. of 20 mm²/s)
Refrigerant oil 5 (refrigerant oil containing a polyol ester as its main component): a pentaerythritol octanoic acid nonanoic acid ester with a carbon/oxygen molar ratio of 4.8 and a kinematic viscosity at 40° C. of 46 mm$^2$/s Refrigerant oil 6 (refrigerant oil containing polyvinyl ether as its main component): a copolymer of ethyl vinyl ether and isobutyl vinyl ether with a molar ratio of ethyl vinyl ether to isobutyl vinyl ether of 7/1, a carbon/oxygen molar ratio of 4.3, and a kinematic viscosity at 40° C. of 46 mm$^2$/s Refrigerant oil 7 (refrigerant containing a polyol ester as its main component): a pentaerythritol octanoic acid nonanoic acid ester with a carbon/oxygen molar ratio of 4.8 and a kinematic viscosity at 40° C. of 100 mm$^2$/s Refrigerant oil 8 (refrigerant oil containing polyvinyl ether as its main component): a copolymer of ethyl vinyl ether and isobutyl vinyl ether with a molar ratio of ethyl vinyl ether to isobutyl vinyl ether of 7/1, a carbon/oxygen molar ratio of 4.3, and a kinematic viscosity at 40° C. of 100 mm$^2$/s Incidentally, the working mediums for heat cycle 9 to 56 each use as HCFO-1224yd a mixture of an E-isomer and a Z-isomer obtained by synthesis, and in Table 2 and Table 3, the isomers are just described as "HFO-1224yd" simply without distinction. Incidentally, the mixture of the E-isomer and the Z-isomer as HCFO-1224yd used here is one containing HCFO-1224yd(E) and HCFO-1224yd(Z) at a HCFO-1224yd(E):HCFO-1224yd(Z) ratio of 15:85 (mass ratio).

TABLE 2

| Working medium | Proportion in working medium [mass %] | | | | | |
|---|---|---|---|---|---|---|
| | HCFO-1224yd(Z) | HCFO-1224yd(E) | HCFO-1224yd | HFC-134a | HFC-245fa | HFC-365mfc |
| 1 | 100 | | | | | |
| 2 | 95 | 5 | | | | |
| 3 | 90 | 10 | | | | |
| 4 | 85 | 15 | | | | |
| 5 | 80 | 20 | | | | |
| 6 | 70 | 30 | | | | |
| 7 | 60 | 40 | | | | |
| 8 | 50 | 50 | | | | |
| 9 | | | 95 | 5 | | |
| 10 | | | 90 | 10 | | |
| 11 | | | 80 | 20 | | |
| 12 | | | 70 | 30 | | |
| 13 | | | 60 | 40 | | |
| 14 | | | 50 | 50 | | |
| 15 | | | 95 | | 5 | |
| 16 | | | 90 | | 10 | |
| 17 | | | 80 | | 20 | |
| 18 | | | 70 | | 30 | |
| 19 | | | 60 | | 40 | |
| 20 | | | 50 | | 50 | |
| 21 | | | 95 | | | 5 |
| 22 | | | 90 | | | 10 |
| 23 | | | 80 | | | 20 |
| 24 | | | 70 | | | 30 |
| 25 | | | 60 | | | 40 |
| 26 | | | 50 | | | 50 |

TABLE 3

| Working medium | Proportion in working medium [mass %] | | | | | | |
|---|---|---|---|---|---|---|---|
| | HCFO-1224yd | HFO-1234yf | HFO-1234ze(E) | HFO-1234ze(Z) | HFO-1336mzz(Z) | HCFO-1233zd(E) | HCFO-1233zd(Z) |
| 27 | 90 | 10 | | | | | |
| 28 | 70 | 30 | | | | | |
| 29 | 50 | 50 | | | | | |
| 30 | 30 | 70 | | | | | |
| 31 | 10 | 90 | | | | | |
| 32 | 90 | | 10 | | | | |
| 33 | 70 | | 30 | | | | |
| 34 | 50 | | 50 | | | | |
| 35 | 30 | | 70 | | | | |
| 36 | 10 | | 90 | | | | |
| 37 | 90 | | | 10 | | | |
| 38 | 70 | | | 30 | | | |
| 39 | 50 | | | 50 | | | |
| 40 | 30 | | | 70 | | | |
| 41 | 10 | | | 90 | | | |
| 42 | 90 | | | | 10 | | |
| 43 | 70 | | | | 30 | | |
| 44 | 50 | | | | 50 | | |
| 45 | 30 | | | | 70 | | |

TABLE 3-continued

| | Proportion in working medium [mass %] | | | | | | |
|---|---|---|---|---|---|---|---|
| Working medium | HCFO-1224yd | HFO-1234yf | HFO-1234ze(E) | HFO-1234ze(Z) | HFO-1336mzz(Z) | HCFO-1233zd(E) | HCFO-1233zd(Z) |
| 46 | 10 | | | | | 90 | |
| 47 | 90 | | | | | | 10 |
| 48 | 70 | | | | | | 30 |
| 49 | 50 | | | | | | 50 |
| 50 | 30 | | | | | | 70 |
| 51 | 10 | | | | | | 90 |
| 52 | 90 | | | | 10 | | |
| 53 | 70 | | | | 30 | | |
| 54 | 50 | | | | 50 | | |
| 55 | 30 | | | | 70 | | |
| 56 | 10 | | | | 90 | | |

[Stability Test]

Each of the compositions for a heat cycle system obtained in Examples 1 to 367 was put in a 200 ml stainless steel pressure resistant container in which a 150 ml glass tube was set. Here, a mixing amount of the working medium was 50 g, and a mixing amount of the stabilizer was 0.5 g (1 mass % with respect to the working medium), and in the case of mixing a refrigerant oil, 50 g was added. Further, the air having an oxygen concentration adjusted to 18 vol % was put, and the container was closed. Then, the closed pressure resistant container was stored in a thermostatic oven (perfect oven PHH-202, manufactured by ESPEC CORP.) at 175° C. for 14 days, and the acid content in the working medium and the total acid value of the refrigerant oil were analyzed as follows.

(Acid Content Measurement)

The pressure resistant container after the above-described test was left at rest until its temperature became room temperature.

Further, 100 ml of pure water was put into each of 4 absorption bulbs, and one in which the absorption bulbs were connected in series by a capillary tube was prepared.

The absorption bulbs in which pure water was put connected to one another were connected to the pressure resistant container at room temperature, and a valve of the pressure resistant container was gradually opened to introduce a refrigerant gas into the water in the absorption bulbs, and the acid content contained in the refrigerant gas was extracted.

The resultant after the water in the first absorption bulb and the water in the second absorption bulb after the extraction were put together to have one drop of an indicator (BTB: bromothymol blue) added thereto was subjected to titration using a 1/100N—NaOH alkali standard solution. At the same time, the resultant after the water in the third absorption bulb and the water in the fourth absorption bulb were put together was subjected to titration similarly, to be set as a blank measurement. From a measured value and a value of the blank measurement, the acid content contained in the refrigerant after the test was obtained as HCl concentration.

(Analysis of Total Acid Value of Refrigerant Oil)

The total acid value of the refrigerant oil after collection of the working medium gas was measured as follows by a method in conformity with the total acid value analysis method of JIS-K-2211 (refrigerant oil). The refrigerant oil remaining in the pressure resistant container after the above-described test was weighed and dissolved in a toluene/isopropanol/water mixed solution, and the resultant solution was subjected to neutralization titration with a 1/100N—KOH/ethanol solution using p-naphtholbenzein as an indicator, and the total acid value (mg·KOH/g) of the refrigerant oil was measured from the titer.

TABLE 4

(Mass %)

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| COMPOSITION | Working medium 1 | 99 | 99 | 99 | 99 | | | | | | | | | | | |
| | Working medium 2 | | | | | | | | | 99 | | | | | | |
| | Working medium 3 | | | | | | | | | | 99 | | | | | |
| | Working medium 4 | | | | | | | | | | | 99 | | | | |
| | Working medium 5 | | | | | | | | | | | | 99 | | | |
| | Working medium 6 | | | | | | | | | | | | | 99 | | |
| | Working medium 7 | | | | | | | | | | | | | | 99 | |
| | Working medium 8 | | | | | 99 | 99 | 99 | 99 | | | | | | | |
| | Working medium 9 | | | | | | | | | | | | | | | 99 |
| | Working medium 10 | | | | | | | | | | | | | | | |
| | Stabilizer 1 | 1.0 | | | | 1.0 | | | | | 1.0 | 1.0 | 1.0 | | | |
| | Stabilizer 2 | | 1.0 | | | | 1.0 | | | | | | | 1.0 | 1.0 | |
| | Stabilizer 3 | | | 1.0 | | | | 1.0 | | | | | | | | 1.0 |
| | Stabilizer 4 | | | | 1.0 | | | | 1.0 | | | | | | 1.0 | |
| | Refrigerant oil 1 | | | | | | | | | | | | | | | |
| | Refrigerant oil 2 | | | | | | | | | | | | | | | |
| | Refrigerant oil 3 | | | | | | | | | | | | | | | |
| | Refrigerant oil 4 | | | | | | | | | | | | | | | |

TABLE 4-continued (Mass %)

| | | Example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | — | — | — | — | — | — | — | — | — | — | — | — | — | — |

TABLE 5

(mass %)

| | | Example | | | | | | | | | | | | | | |
|---|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 |
| COMPOSITION | Working medium 1 | | 49.75 | | | | | | | | | | 49.75 | | | |
| | Working medium 2 | | | 49.75 | | | | | | | | | | 49.75 | | |
| | Working medium 3 | | | | 49.75 | | | | | | | | | | 49.75 | |
| | Working medium 4 | | | | | 49.75 | | | | | | | | | | 49.75 |
| | Working medium 5 | | | | | | 49.75 | | | | | | | | | |
| | Working medium 6 | | | | | | | 49.75 | | | | | | | | |
| | Working medium 7 | | | | | | | | 49.75 | | | | | | | |
| | Working medium 8 | | | | | | | | | 49.75 | | | | | | |
| | Working medium 9 | | | | | | | | | | 49.75 | | | | | |
| | Working medium 10 | 99 | | | | | | | | | | 49.75 | | | | |
| | Stabilizer 1 | | 0.5 | | | | 0.5 | | | | | 0.5 | | | | 0.5 |
| | Stabilizer 2 | 1.0 | | 0.5 | 0.5 | | | 0.5 | | | | | | | | |
| | Stabilizer 3 | | | | | | | | 0.5 | | | | 0.5 | 0.5 | | |
| | Stabilizer 4 | | | | | 0.5 | | | | 0.5 | 0.5 | | | | 0.5 | |
| | Refrigerant oil 1 | | 49.75 | 49.75 | | | 49.75 | | | | | 49.75 | | | 49.75 | |
| | Refrigerant oil 2 | | | | | | | 49.75 | | | | | 49.75 | 49.75 | | 49.75 |
| | Refrigerant oil 3 | | | | | | | | | 49.75 | 49.75 | | | | | |
| | Refrigerant oil 4 | | | | 49.75 | 49.75 | | | | | | | 49.75 | | | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | <1 | <1 | <1 | <1 | <1 | <1 | <1 | <1 | <1 | <1 | <1 | <1 | <1 | <1 |

TABLE 6

(mass %)

| | | Example | | | | | | | | | | | | | | |
|---|---|---|---|---|---|---|---|---|---|---|---|---|---|---|---|---|
| | | 31 | 32 | 33 | 34 | 35 | 36 | 37 | 38 | 39 | 40 | 41 | 42 | 43 | 44 | 45 |
| COMPOSITION | Working medium 1 | | | | | | | 49.75 | | | | | | | | |
| | Working medium 2 | | | | | | | | 49.75 | | | | | | | |
| | Working medium 3 | | | | | | | | | 49.75 | | | | | | |
| | Working medium 4 | | | | | | | | | | 49.75 | | | | | |
| | Working medium 5 | 49.75 | | | | | | | | | | 49.75 | | | | |
| | Working medium 6 | | 49.75 | | | | | | | | | | 49.75 | | | |
| | Working medium 7 | | | 49.75 | | | | | | | | | | 49.75 | | |
| | Working medium 8 | | | | 49.75 | | | | | | | | | | 49.75 | |
| | Working medium 9 | | | | | 49.75 | | | | | | | | | | 49.75 |
| | Working medium 10 | | | | | | 49.75 | | | | | | | | | |
| | Stabilizer 1 | | | | | | 0.5 | | | | | | | 0.5 | | |
| | Stabilizer 2 | 0.5 | | | | 0.5 | | | | | 0.5 | | | | 0.5 | |
| | Stabilizer 3 | | 0.5 | | 0.5 | | | | | | | | 0.5 | | | 0.5 |
| | Stabilizer 4 | | | 0.5 | | | | 0.5 | 0.5 | | | 0.5 | | | | |
| | Refrigerant oil 1 | | | 49.75 | | | | 49.75 | | | | 49.75 | | | 49.75 | |
| | Refrigerant oil 2 | | 49.75 | | 49.75 | | | | | 49.75 | | | 49.75 | | | 49.75 |
| | Refrigerant oil 3 | 49.75 | | | | 49.75 | | | | | 49.75 | | | | | |
| | Refrigerant oil 4 | | | | | | 49.75 | | 49.75 | | | | | 49.75 | | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | <1 | <1 | <1 | <1 | <1 | <1 | <1 | <1 | <1 | <1 | <1 | <1 | <1 | <1 | <1 |

TABLE 7

| | | Example (mass %) | | | | | | | | | | | | | | |
|---|---|---|---|---|---|---|---|---|---|---|---|---|---|---|---|---|
| | | 46 | 47 | 48 | 49 | 50 | 51 | 52 | 53 | 54 | 55 | 56 | 57 | 58 | 59 | 60 |
| COMPOSITION | Working medium 1 | | 100 | | | | | | | | | | 50 | | | |
| | Working medium 2 | | | 100 | | | | | | | | | | 50 | | |
| | Working medium 3 | | | | 100 | | | | | | | | | | 50 | |
| | Working medium 4 | | | | | 100 | | | | | | | | | | 50 |
| | Working medium 5 | | | | | | 100 | | | | | | | | | |
| | Working medium 6 | | | | | | | 100 | | | | | | | | |
| | Working medium 7 | | | | | | | | 100 | | | | | | | |
| | Working medium 8 | | | | | | | | | 100 | | | | | | |
| | Working medium 9 | | | | | | | | | | 100 | | | | | |
| | Working medium 10 | 49.75 | | | | | | | | | | 100 | | | | |
| | Stabilizer 1 | | | | | | | | | | | | | | | |
| | Stabilizer 2 | | | | | | | | | | | | | | | |
| | Stabilizer 3 | | | | | | | | | | | | | | | |
| | Stabilizer 4 | 0.5 | | | | | | | | | | | | | | |
| | Refrigerant oil 1 | | | | | | | | | | | | 50 | 50 | | |
| | Refrigerant oil 2 | | | | | | | | | | | | | | 50 | 50 |
| | Refrigerant oil 3 | 49.75 | | | | | | | | | | | | | | |
| | Refrigerant oil 4 | | | | | | | | | | | | | | | |
| PROPERTY | Acid content (as HCl) [ppm] | <1 | 14 | 13 | 12 | 12 | 15 | 17 | 11 | 13 | 14 | 13 | 10 | 13 | 10 | 12 |
| | Total acid value [mg/g KOH] | <1 | — | — | — | — | — | — | — | — | — | — | 5.2 | 4.3 | 5.5 | 5.1 |

TABLE 8

| | | Example (mass %) | | | | | |
|---|---|---|---|---|---|---|---|
| | | 61 | 62 | 63 | 64 | 65 | 66 |
| COMPOSITION | Working medium 1 | | | | | | |
| | Working medium 2 | | | | | | |
| | Working medium 3 | | | | | | |
| | Working medium 4 | | | | | | |
| | Working medium 5 | 50 | | | | | |
| | Working medium 6 | | 50 | | | | |
| | Working medium 7 | | | 50 | | | |
| | Working medium 8 | | | | 50 | | |
| | Working medium 9 | | | | | 50 | |
| | Working medium 10 | | | | | | 50 |
| | Stabilizer 1 | | | | | | |
| | Stabilizer 2 | | | | | | |
| | Stabilizer 3 | | | | | | |
| | Stabilizer 4 | | | | | | |
| | Refrigerant oil 1 | | | 50 | | | |
| | Refrigerant oil 2 | | | | 50 | | |
| | Refrigerant oil 3 | 50 | | | | 50 | |
| | Refrigerant oil 4 | | 50 | | | | 50 |
| PROPERTY | Acid content (as HCl) [ppm] | 14 | 13 | 11 | 16 | 15 | 14 |
| | Total acid value [mg/g KOH] | 4.8 | 4.2 | 4.7 | 5.3 | 5.2 | 4.5 |

TABLE 9

| | | Example (mass %) | | | | | | | | | | | | | | |
|---|---|---|---|---|---|---|---|---|---|---|---|---|---|---|---|
| | | 67 | 68 | 69 | 70 | 71 | 72 | 73 | 74 | 75 | 76 | 77 | 78 | 79 | 80 | 81 |
| COMPOSITION | Working medium 1 | 49.75 | | | | | 49.75 | | | | | 49.75 | | | | |
| | Working medium 2 | | 49.75 | | | | | 49.75 | | | | | 49.75 | | | |
| | Working medium 3 | | | 49.75 | | | | | 49.75 | | | | | 49.75 | | |
| | Working medium 4 | | | | 49.75 | | | | | 49.75 | | | | | 49.75 | |

TABLE 9-continued

|  |  | Example (mass %) | | | | | | | | | | | | | | |
|---|---|---|---|---|---|---|---|---|---|---|---|---|---|---|---|
|  |  | 67 | 68 | 69 | 70 | 71 | 72 | 73 | 74 | 75 | 76 | 77 | 78 | 79 | 80 | 81 |
|  | Working medium 5 |  |  |  |  | 49.75 |  |  |  |  | 49.75 |  |  |  |  | 49.75 |
|  | Stabilizer 1 | 0.5 |  |  |  | 0.5 |  |  |  |  | 0.5 |  |  |  |  |  |
|  | Stabilizer 2 |  | 0.5 | 0.5 |  |  |  |  |  |  | 0.5 |  |  |  | 0.5 |  |
|  | Stabilizer 3 |  |  |  |  |  | 0.5 | 0.5 |  |  |  |  |  | 0.5 |  | 0.5 |
|  | Stabilizer 4 |  |  |  | 0.5 |  |  |  | 0.5 |  |  | 0.5 | 0.5 |  |  |  |
|  | Refrigerant oil 5 | 49.75 | 49.75 | 49.75 | 49.75 | 49.75 |  |  |  |  |  |  |  |  |  |  |
|  | Refrigerant oil 6 |  |  |  |  |  | 49.75 | 49.75 | 49.75 | 49.75 | 49.75 |  |  |  |  |  |
|  | Refrigerant oil 7 |  |  |  |  |  |  |  |  |  |  | 49.75 | 49.75 | 49.75 | 49.75 | 49.75 |
|  | Refrigerant oil 8 |  |  |  |  |  |  |  |  |  |  |  |  |  |  |  |
| PROPERTY | Acid content (as HCl) [ppm] | <1 | <1 | <1 | <1 | <1 | <1 | <1 | <1 | <1 | <1 | <1 | <1 | <1 | <1 | <1 |
|  | Total acid value [mg/g KOH] | <1 | <1 | <1 | <1 | <1 | <1 | <1 | <1 | <1 | <1 | <1 | <1 | <1 | <1 | <1 |

TABLE 10

|  |  | Example (mass %) | | | | | | | | | |
|---|---|---|---|---|---|---|---|---|---|---|---|
|  |  | 82 | 83 | 84 | 85 | 86 | 87 | 88 | 89 | 90 | 91 |
| COMPOSITION | Working medium 1 | 49.75 |  |  |  |  | 50 |  |  |  |  |
|  | Working medium 2 |  | 49.75 |  |  |  |  | 50 |  |  |  |
|  | Working medium 3 |  |  | 49.75 |  |  |  |  | 50 |  |  |
|  | Working medium 4 |  |  |  | 49.75 |  |  |  |  | 50 |  |
|  | Working medium 5 |  |  |  |  | 49.75 |  |  |  |  | 50 |
|  | Stabilizer 1 |  |  |  |  |  |  |  |  |  |  |
|  | Stabilizer 2 | 0.5 |  |  |  | 0.5 |  |  |  |  |  |
|  | Stabilizer 3 |  |  | 0.5 |  |  |  |  |  |  |  |
|  | Stabilizer 4 |  | 0.5 |  | 0.5 |  |  |  |  |  |  |
|  | Refrigerant oil 5 |  |  |  |  |  | 50 | 50 |  |  |  |
|  | Refrigerant oil 6 |  |  |  |  |  |  |  | 50 | 50 |  |
|  | Refrigerant oil 7 |  |  |  |  |  |  |  |  |  | 50 |
|  | Refrigerant oil 8 | 49.75 | 49.75 | 49.75 | 49.75 | 49.75 |  |  |  |  |  |
| PROPERTY | Acid content (as HCl) [ppm] | <1 | <1 | <1 | <1 | <1 | 10 | 13 | 10 | 12 | 14 |
|  | Total acid value [mg/g KOH] | <1 | <1 | <1 | <1 | <1 | 5.2 | 4.3 | 5.5 | 5.1 | 4.8 |

TABLE 11

|  |  | Example (mass %) | | | | | | | | | | | | | | |
|---|---|---|---|---|---|---|---|---|---|---|---|---|---|---|---|---|
|  |  | 92 | 93 | 94 | 95 | 96 | 97 | 98 | 99 | 100 | 101 | 102 | 103 | 104 | 105 | 106 |
| COMPOSITION | Working medium 11 | 99 |  |  |  |  |  |  |  |  |  | 49.75 |  |  |  |  |
|  | Working medium 12 |  | 99 |  |  |  |  |  |  |  |  |  | 49.75 |  |  |  |
|  | Working medium 13 |  |  | 99 |  |  |  |  |  |  |  |  |  | 49.75 |  |  |
|  | Working medium 14 |  |  |  | 99 |  |  |  |  |  |  |  |  |  | 49.75 |  |
|  | Working medium 15 |  |  |  |  | 99 |  |  |  |  |  |  |  |  |  | 49.75 |
|  | Working medium 16 |  |  |  |  |  | 99 |  |  |  |  |  |  |  |  |  |
|  | Working medium 17 |  |  |  |  |  |  | 99 |  |  |  |  |  |  |  |  |
|  | Working medium 18 |  |  |  |  |  |  |  | 99 |  |  |  |  |  |  |  |
|  | Working medium 19 |  |  |  |  |  |  |  |  | 99 |  |  |  |  |  |  |
|  | Working medium 20 |  |  |  |  |  |  |  |  |  | 99 |  |  |  |  |  |
|  | Stabilizer 1 | 1.0 | 1.0 | 1.0 | 1.0 |  |  |  | 1.0 |  |  | 0.5 |  |  |  | 0.5 |
|  | Stabilizer 2 |  |  |  |  | 1.0 | 1.0 |  |  |  | 1.0 |  | 0.5 | 0.5 |  |  |
|  | Stabilizer 3 |  |  |  |  |  |  |  |  | 1.0 |  |  |  |  |  |  |
|  | Stabilizer 4 |  |  |  |  |  |  | 1.0 |  |  |  |  |  |  | 0.5 |  |
|  | Refrigerant oil 1 |  |  |  |  |  |  |  |  |  |  | 49.75 | 49.75 |  |  |  |
|  | Refrigerant oil 2 |  |  |  |  |  |  |  |  |  |  |  |  |  |  | 49.75 |
|  | Refrigerant oil 3 |  |  |  |  |  |  |  |  |  |  |  |  |  |  |  |
|  | Refrigerant oil 4 |  |  |  |  |  |  |  |  |  |  |  |  | 49.75 | 49.75 |  |

TABLE 11-continued (mass %)

| | | Example | | | | | | | | | | | | | | |
|---|---|---|---|---|---|---|---|---|---|---|---|---|---|---|---|
| | | 92 | 93 | 94 | 95 | 96 | 97 | 98 | 99 | 100 | 101 | 102 | 103 | 104 | 105 | 106 |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | — | — | — | — | — | — | — | — | — | <1 | <1 | <1 | <1 | <1 |

TABLE 12

(mass %)

| | | Example | | | | | | | | | | | | | | |
|---|---|---|---|---|---|---|---|---|---|---|---|---|---|---|---|---|
| | | 107 | 108 | 109 | 110 | 111 | 112 | 113 | 114 | 115 | 116 | 117 | 118 | 119 | 120 | 121 |
| COMPOSITION | Working medium 11 | | | | | | 49.75 | | | | | | | | | |
| | Working medium 12 | | | | | | | 49.75 | | | | | | | | |
| | Working medium 13 | | | | | | | | 49.75 | | | | | | | |
| | Working medium 14 | | | | | | | | | 49.75 | | | | | | |
| | Working medium 15 | | | | | | | | | | 49.75 | | | | | |
| | Working medium 16 | 49.75 | | | | | | | | | | 49.75 | | | | |
| | Working medium 17 | | 49.75 | | | | | | | | | | 49.75 | | | |
| | Working medium 18 | | | 49.75 | | | | | | | | | | 49.75 | | |
| | Working medium 19 | | | | 49.75 | | | | | | | | | | 49.75 | |
| | Working medium 20 | | | | | 49.75 | | | | | | | | | | 49.75 |
| | Stabilizer 1 | | | | | 0.5 | | | | 0.5 | | | | | | 0.5 |
| | Stabilizer 2 | 0.5 | | | | | | | | | 0.5 | | | | 0.5 | |
| | Stabilizer 3 | | 0.5 | | | | 0.5 | 0.5 | | | | 0.5 | | 0.5 | | |
| | Stabilizer 4 | | | 0.5 | 0.5 | | | | 0.5 | | | | 0.5 | | | |
| | Refrigerant oil 1 | 49.75 | | | 49.75 | | | | | 49.75 | | | | 49.75 | | |
| | Refrigerant oil 2 | | | | | | 49.75 | 49.75 | | | 49.75 | | | | 49.75 | |
| | Refrigerant oil 3 | | 49.75 | 49.75 | | | | | | | | 49.75 | | | | 49.75 |
| | Refrigerant oil 4 | | | | | 49.75 | | | 49.75 | | | | 49.75 | | | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | <1 | <1 | <1 | <1 | <1 | <1 | <1 | <1 | <1 | <1 | <1 | <1 | <1 | <1 | <1 |

TABLE 13

(mass %)

| | | Example | | | | | | | | | | | | | | |
|---|---|---|---|---|---|---|---|---|---|---|---|---|---|---|---|---|
| | | 122 | 123 | 124 | 125 | 126 | 127 | 128 | 129 | 130 | 131 | 132 | 133 | 134 | 135 | 136 |
| COMPOSITION | Working medium 11 | 49.75 | | | | | | | | | | 100 | | | | |
| | Working medium 12 | | 49.75 | | | | | | | | | | 100 | | | |
| | Working medium 13 | | | 49.75 | | | | | | | | | | 100 | | |
| | Working medium 14 | | | | 49.75 | | | | | | | | | | 100 | |
| | Working medium 15 | | | | | 49.75 | | | | | | | | | | 100 |
| | Working medium 16 | | | | | | 49.75 | | | | | | | | | |
| | Working medium 17 | | | | | | | 49.75 | | | | | | | | |
| | Working medium 18 | | | | | | | | 49.75 | | | | | | | |
| | Working medium 19 | | | | | | | | | 49.75 | | | | | | |
| | Working medium 20 | | | | | | | | | | 49.75 | | | | | |
| | Stabilizer 1 | | | | | | | 0.5 | | | | | | | | |
| | Stabilizer 2 | | | | 0.5 | | | | 0.5 | | | | | | | |
| | Stabilizer 3 | | | 0.5 | | 0.5 | | | | 0.5 | | | | | | |
| | Stabilizer 4 | 0.5 | 0.5 | | | | 0.5 | | | | 0.5 | | | | | |
| | Refrigerant oil 1 | | | | 49.75 | | | 49.75 | | | | | | | | |
| | Refrigerant oil 2 | | | 49.75 | | | 49.75 | | 49.75 | | 49.75 | | | | | |
| | Refrigerant oil 3 | | 49.75 | | | 49.75 | | | | 49.75 | | | | | | |
| | Refrigerant oil 4 | 49.75 | | | | 49.75 | | | | | | | | | | |
| PROPERTY | Acid content (as HCl) [ppm] | <1 | <1 | <1 | <1 | <1 | <1 | <1 | <1 | <1 | <1 | 14 | 13 | 12 | 12 | 15 |
| | Total acid value [mg/g KOH] | <1 | <1 | <1 | <1 | <1 | <1 | <1 | <1 | <1 | <1 | — | — | — | — | — |

TABLE 14

(mass %)

| | | Example | | | | | | | | | | | | | | |
|---|---|---|---|---|---|---|---|---|---|---|---|---|---|---|---|---|
| | | 137 | 138 | 139 | 140 | 141 | 142 | 143 | 144 | 145 | 146 | 147 | 148 | 149 | 150 | 151 |
| COMPOSITION | Working medium 11 | | | | | | 50 | | | | | | | | | |
| | Working medium 12 | | | | | | | 50 | | | | | | | | |
| | Working medium 13 | | | | | | | | 50 | | | | | | | |
| | Working medium 14 | | | | | | | | | 50 | | | | | | |
| | Working medium 15 | | | | | | | | | | 50 | | | | | |
| | Working medium 16 | 100 | | | | | | | | | | 50 | | | | |
| | Working medium 17 | | 100 | | | | | | | | | | 50 | | | |
| | Working medium 18 | | | 100 | | | | | | | | | | 50 | | |
| | Working medium 19 | | | | 100 | | | | | | | | | | 50 | |
| | Working medium 20 | | | | | 100 | | | | | | | | | | 50 |
| | Stabilizer 1 | | | | | | | | | | | | | | | |
| | Stabilizer 2 | | | | | | | | | | | | | | | |
| | Stabilizer 3 | | | | | | | | | | | | | | | |
| | Stabilizer 4 | | | | | | | | | | | | | | | |
| | Refrigerant oil 1 | | | | | | 50 | 50 | | | | 50 | | | | |
| | Refrigerant oil 2 | | | | | | | | 50 | 50 | | | | 50 | | |
| | Refrigerant oil 3 | | | | | | | | | | 50 | | | | 50 | |
| | Refrigerant oil 4 | | | | | | | | | | | | 50 | | | 50 |
| PROPERTY | Acid content (as HCl) [ppm] | 17 | 11 | 13 | 14 | 13 | 10 | 13 | 10 | 12 | 14 | 13 | 11 | 16 | 15 | 14 |
| | Total acid value [mg/g KOH] | — | — | — | — | — | 5.2 | 4.3 | 5.5 | 5.1 | 4.8 | 4.2 | 4.7 | 5.3 | 5.2 | 4.5 |

TABLE 15

(mass %)

| | Example | 152 | 153 | 154 | 155 | 156 | 157 | 158 | 159 | 160 | 161 | 162 | 163 | 164 | 165 | 166 |
|---|---|---|---|---|---|---|---|---|---|---|---|---|---|---|---|---|
| COMPOSITION | Working medium 21 | 99 | | | | | | | | | | 49.75 | | | | |
| | Working medium 22 | | 99 | | | | | | | | | | 49.75 | | | |
| | Working medium 23 | | | 99 | | | | | | | | | | 49.75 | | |
| | Working medium 24 | | | | 99 | | | | | | | | | | 49.75 | |
| | Working medium 25 | | | | | 99 | | | | | | | | | | 49.75 |
| | Working medium 26 | | | | | | 99 | | | | | | | | | |
| | Working medium 27 | | | | | | | 99 | | | | | | | | |
| | Working medium 28 | | | | | | | | 99 | | | | | | | |
| | Working medium 29 | | | | | | | | | 99 | | | | | | |
| | Working medium 30 | | | | | | | | | | 99 | | | | | |
| | Stabilizer 1 | 1.0 | 1.0 | 1.0 | 1.0 | | | | 1.0 | | | 0.5 | | | | 0.5 |
| | Stabilizer 2 | | | | | 1.0 | 1.0 | | | | 1.0 | | 0.5 | 0.5 | | |
| | Stabilizer 3 | | | | | | | | | 1.0 | | | | | | |
| | Stabilizer 4 | | | | | | | 1.0 | | | | | | | 0.5 | |
| | Refrigerant oil 1 | | | | | | | | | | | 49.75 | 49.75 | | | |
| | Refrigerant oil 2 | | | | | | | | | | | | | | | 49.75 |
| | Refrigerant oil 3 | | | | | | | | | | | | | | | |
| | Refrigerant oil 4 | | | | | | | | | | | | | 49.75 | 49.75 | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | — | — | — | — | — | — | — | — | — | <1 | <1 | <1 | <1 | <1 |

TABLE 16

(mass %)

| | Example | 167 | 168 | 169 | 170 | 171 | 172 | 173 | 174 | 175 | 176 | 177 | 178 | 179 | 180 | 181 |
|---|---|---|---|---|---|---|---|---|---|---|---|---|---|---|---|---|
| COMPOSITION | Working medium 21 | | | | | | 49.75 | | | | | | | | | |
| | Working medium 22 | | | | | | | 49.75 | | | | | | | | |
| | Working medium 23 | | | | | | | | 49.75 | | | | | | | |
| | Working medium 24 | | | | | | | | | 49.75 | | | | | | |
| | Working medium 25 | | | | | | | | | | 49.75 | | | | | |
| | Working medium 26 | 49.75 | | | | | | | | | | 49.75 | | | | |
| | Working medium 27 | | 49.75 | | | | | | | | | | 49.75 | | | |
| | Working medium 28 | | | 49.75 | | | | | | | | | | 49.75 | | |
| | Working medium 29 | | | | 49.75 | | | | | | | | | | 49.75 | |

TABLE 16-continued

| | Example | 167 | 168 | 169 | 170 | 171 | 172 | 173 | 174 | 175 | 176 | 177 | 178 | 179 | 180 | (mass %) 181 |
|---|---|---|---|---|---|---|---|---|---|---|---|---|---|---|---|---|
| | Working medium 30 | | | | | 49.75 | | | | | | | | | | 49.75 |
| | Stabilizer 1 | | | | | 0.5 | | | | | 0.5 | | | | | 0.5 |
| | Stabilizer 2 | 0.5 | | | | | | | | | | 0.5 | | | 0.5 | |
| | Stabilizer 3 | | 0.5 | | | | 0.5 | 0.5 | | | | | 0.5 | 0.5 | | |
| | Stabilizer 4 | | | 0.5 | 0.5 | | | | 0.5 | 0.5 | | | | | | |
| | Refrigerant oil 1 | 49.75 | | | 49.75 | | | | 49.75 | | | 49.75 | | | | |
| | Refrigerant oil 2 | | | | | | 49.75 | 49.75 | | 49.75 | | | | 49.75 | | |
| | Refrigerant oil 3 | | 49.75 | 49.75 | | | | | | | 49.75 | | | | 49.75 | |
| | Refrigerant oil 4 | | | | | 49.75 | | | | | | | 49.75 | | | 49.75 |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | <1 | <1 | <1 | <1 | <1 | <1 | <1 | <1 | <1 | <1 | <1 | <1 | <1 | <1 | <1 |

TABLE 17

| | Example | 182 | 183 | 184 | 185 | 186 | 187 | 188 | 189 | 190 | 191 | 192 | 193 | 194 | 195 | (mass %) 196 |
|---|---|---|---|---|---|---|---|---|---|---|---|---|---|---|---|---|
| COMPOSITION | Working medium 21 | 49.75 | | | | | | | | | | 100 | | | | |
| | Working medium 22 | | 49.75 | | | | | | | | | | 100 | | | |
| | Working medium 23 | | | 49.75 | | | | | | | | | | 100 | | |
| | Working medium 24 | | | | 49.75 | | | | | | | | | | 100 | |
| | Working medium 25 | | | | | 49.75 | | | | | | | | | | 100 |
| | Working medium 26 | | | | | | 49.75 | | | | | | | | | |
| | Working medium 27 | | | | | | | 49.75 | | | | | | | | |
| | Working medium 28 | | | | | | | | 49.75 | | | | | | | |
| | Working medium 29 | | | | | | | | | 49.75 | | | | | | |
| | Working medium 30 | | | | | | | | | | 49.75 | | | | | |
| | Stabilizer 1 | | | | | | | 0.5 | | | | | | | | |
| | Stabilizer 2 | | | | | 0.5 | | | 0.5 | | | | | | | |
| | Stabilizer 3 | | | 0.5 | | | 0.5 | | | 0.5 | | | | | | |
| | Stabilizer 4 | 0.5 | 0.5 | | 0.5 | | | | | | 0.5 | | | | | |
| | Refrigerant oil 1 | | | | 49.75 | | | | 49.75 | | | | | | | |
| | Refrigerant oil 2 | | | 49.75 | | | 49.75 | | | | 49.75 | | | | | |
| | Refrigerant oil 3 | | 49.75 | | | | | 49.75 | | | | | | | | |
| | Refrigerant oil 4 | 49.75 | | | | 49.75 | | | | | | | | | | |
| PROPERTY | Acid content (as HCl) [ppm] | <1 | <1 | <1 | <1 | <1 | <1 | <1 | <1 | <1 | <1 | 14 | 13 | 12 | 12 | 15 |
| | Total acid value [mg/g KOH] | <1 | <1 | <1 | <1 | <1 | <1 | <1 | <1 | <1 | <1 | — | — | — | — | — |

TABLE 18

| | Example | 197 | 198 | 199 | 200 | 201 | 202 | 203 | 204 | 205 | 206 | 207 | 208 | 209 | 210 | (mass %) 211 |
|---|---|---|---|---|---|---|---|---|---|---|---|---|---|---|---|---|
| COMPOSITION | Working medium 21 | | | | | | 50 | | | | | | | | | |
| | Working medium 22 | | | | | | | 50 | | | | | | | | |
| | Working medium 23 | | | | | | | | 50 | | | | | | | |
| | Working medium 24 | | | | | | | | | 50 | | | | | | |
| | Working medium 25 | | | | | | | | | | 50 | | | | | |
| | Working medium 26 | 100 | | | | | | | | | | 50 | | | | |
| | Working medium 27 | | 100 | | | | | | | | | | 50 | | | |
| | Working medium 28 | | | 100 | | | | | | | | | | 50 | | |
| | Working medium 29 | | | | 100 | | | | | | | | | | 50 | |
| | Working medium 30 | | | | | 100 | | | | | | | | | | 50 |
| | Stabilizer 1 | | | | | | | | | | | | | | | |
| | Stabilizer 2 | | | | | | | | | | | | | | | |
| | Stabilizer 3 | | | | | | | | | | | | | | | |
| | Stabilizer 4 | | | | | | | | | | | | | | | |
| | Refrigerant oil 1 | | | | | | 50 | 50 | | | | 50 | | | | |
| | Refrigerant oil 2 | | | | | | | | 50 | 50 | | | | 50 | | |
| | Refrigerant oil 3 | | | | | | | | | | 50 | | 50 | | 50 | |
| | Refrigerant oil 4 | | | | | | | | | | | | | | | 50 |
| PROPERTY | Acid content (as HCl) [ppm] | 17 | 11 | 13 | 14 | 13 | 10 | 13 | 10 | 12 | 14 | 13 | 11 | 16 | 15 | 14 |
| | Total acid value [mg/g KOH] | — | — | — | — | — | 5.2 | 4.3 | 5.5 | 5.1 | 4.8 | 4.2 | 4.7 | 5.3 | 5.2 | 4.5 |

TABLE 19

| Example | | 212 | 213 | 214 | 215 | 216 | 217 | 218 | 219 | 220 | 221 | 222 | 223 | 224 | 225 | 226 (mass %) |
|---|---|---|---|---|---|---|---|---|---|---|---|---|---|---|---|---|
| COMPOSITION | Working medium 31 | 99 | | | | | | | | | | 49.75 | | | | |
| | Working medium 32 | | 99 | | | | | | | | | | 49.75 | | | |
| | Working medium 33 | | | 99 | | | | | | | | | | 49.75 | | |
| | Working medium 34 | | | | 99 | | | | | | | | | | 49.75 | |
| | Working medium 35 | | | | | 99 | | | | | | | | | | 49.75 |
| | Working medium 36 | | | | | | 99 | | | | | | | | | |
| | Working medium 37 | | | | | | | 99 | | | | | | | | |
| | Working medium 38 | | | | | | | | 99 | | | | | | | |
| | Working medium 39 | | | | | | | | | 99 | | | | | | |
| | Working medium 40 | | | | | | | | | | 99 | | | | | |
| | Stabilizer 1 | 1.0 | 1.0 | 1.0 | 1.0 | | | | 1.0 | | | 0.5 | | | | 0.5 |
| | Stabilizer 2 | | | | | 1.0 | 1.0 | | | | 1.0 | | 0.5 | 0.5 | | |
| | Stabilizer 3 | | | | | | | 1.0 | | | | | | | | |
| | Stabilizer 4 | | | | | | | | | 1.0 | | | | | 0.5 | |
| | Refrigerant oil 1 | | | | | | | | | | | 49.75 | 49.75 | | | |
| | Refrigerant oil 2 | | | | | | | | | | | | | | | 49.75 |
| | Refrigerant oil 3 | | | | | | | | | | | | | | | |
| | Refrigerant oil 4 | | | | | | | | | | | | | 49.75 | 49.75 | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | — | — | — | — | — | — | — | — | — | <1 | <1 | <1 | <1 | <1 |

TABLE 20

| Example | | 227 | 228 | 229 | 230 | 231 | 232 | 233 | 234 | 235 | 236 | 237 | 238 | 239 | 240 | 241 (mass %) |
|---|---|---|---|---|---|---|---|---|---|---|---|---|---|---|---|---|
| COMPOSITION | Working medium 31 | | | | | | 49.75 | | | | | | | | | |
| | Working medium 32 | | | | | | | 49.75 | | | | | | | | |
| | Working medium 33 | | | | | | | | 49.75 | | | | | | | |
| | Working medium 34 | | | | | | | | | 49.75 | | | | | | |
| | Working medium 35 | | | | | | | | | | 49.75 | | | | | |
| | Working medium 36 | 49.75 | | | | | | | | | | 49.75 | | | | |
| | Working medium 37 | | 49.75 | | | | | | | | | | 49.75 | | | |
| | Working medium 38 | | | 49.75 | | | | | | | | | | 49.75 | | |
| | Working medium 39 | | | | 49.75 | | | | | | | | | | 49.75 | |
| | Working medium 40 | | | | | 49.75 | | | | | | | | | | 49.75 |
| | Stabilizer 1 | | | | | | 0.5 | | | | 0.5 | | | | 0.5 | 0.5 |
| | Stabilizer 2 | 0.5 | | | | | | 0.5 | | | | 0.5 | | | | |
| | Stabilizer 3 | | 0.5 | | | 0.5 | 0.5 | | | | | | 0.5 | | 0.5 | |
| | Stabilizer 4 | | | 0.5 | 0.5 | | | | 0.5 | | | | | 0.5 | | |
| | Refrigerant oil 1 | 49.75 | | | 49.75 | | | | 49.75 | | | | 49.75 | | | |
| | Refrigerant oil 2 | | | | | | 49.75 | 49.75 | | 49.75 | | | | 49.75 | | |
| | Refrigerant oil 3 | | 49.75 | 49.75 | | | | | | | 49.75 | | | | 49.75 | |
| | Refrigerant oil 4 | | | | | 49.75 | | | | | | 49.75 | | | | 49.75 |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | <1 | <1 | <1 | <1 | <1 | <1 | <1 | <1 | <1 | <1 | <1 | <1 | <1 | <1 | <1 |

TABLE 21

| Example | | 242 | 243 | 244 | 245 | 246 | 247 | 248 | 249 | 250 | 251 | 252 | 253 | 254 | 255 | 256 (mass %) |
|---|---|---|---|---|---|---|---|---|---|---|---|---|---|---|---|---|
| COMPOSITION | Working medium 31 | 49.75 | | | | | | | | | | 100 | | | | |
| | Working medium 32 | | 49.75 | | | | | | | | | | 100 | | | |
| | Working medium 33 | | | 49.75 | | | | | | | | | | 100 | | |
| | Working medium 34 | | | | 49.75 | | | | | | | | | | 100 | |
| | Working medium 35 | | | | | 49.75 | | | | | | | | | | 100 |
| | Working medium 36 | | | | | | 49.75 | | | | | | | | | |
| | Working medium 37 | | | | | | | 49.75 | | | | | | | | |
| | Working medium 38 | | | | | | | | 49.75 | | | | | | | |
| | Working medium 39 | | | | | | | | | 49.75 | | | | | | |
| | Working medium 40 | | | | | | | | | | 49.75 | | | | | |
| | Stabilizer 1 | | | | | | | | 0.5 | | | | | | | |
| | Stabilizer 2 | | | | 0.5 | | | | | 0.5 | | | | | | |

TABLE 21-continued

| | Example | 242 | 243 | 244 | 245 | 246 | 247 | 248 | 249 | 250 | 251 | 252 | 253 | 254 | 255 | 256 (mass %) |
|---|---|---|---|---|---|---|---|---|---|---|---|---|---|---|---|---|
| | Stabilizer 3 | | | 0.5 | | 0.5 | | | | 0.5 | | | | | | |
| | Stabilizer 4 | 0.5 | 0.5 | | | | | 0.5 | | | 0.5 | | | | | |
| | Refrigerant oil 1 | | | | 49.75 | | | | 49.75 | | | | | | | |
| | Refrigerant oil 2 | | 49.75 | 49.75 | | | 49.75 | | | 49.75 | | | | | | |
| | Refrigerant oil 3 | | 49.75 | | | | 49.75 | | | | 49.75 | | | | | |
| | Refrigerant oil 4 | 49.75 | | | | 49.75 | | | | | | | | | | |
| PROPERTY | Acid content (as HCl) [ppm] | <1 | <1 | <1 | <1 | <1 | <1 | <1 | <1 | <1 | <1 | 14 | 13 | 12 | 12 | 15 |
| | Total acid value [mg/g KOH] | <1 | <1 | <1 | <1 | <1 | <1 | <1 | <1 | <1 | <1 | — | — | — | — | — |

TABLE 22

| | Example | 257 | 258 | 259 | 260 | 261 | 262 | 263 | 264 | 265 | 266 | 267 | 268 | 269 | 270 | 271 (mass %) |
|---|---|---|---|---|---|---|---|---|---|---|---|---|---|---|---|---|
| COMPOSITION | Working medium 31 | | | | | | 50 | | | | | | | | | |
| | Working medium 32 | | | | | | | 50 | | | | | | | | |
| | Working medium 33 | | | | | | | | 50 | | | | | | | |
| | Working medium 34 | | | | | | | | | 50 | | | | | | |
| | Working medium 35 | | | | | | | | | | 50 | | | | | |
| | Working medium 36 | 100 | | | | | | | | | | 50 | | | | |
| | Working medium 37 | | 100 | | | | | | | | | | 50 | | | |
| | Working medium 38 | | | 100 | | | | | | | | | | 50 | | |
| | Working medium 39 | | | | 100 | | | | | | | | | | 50 | |
| | Working medium 40 | | | | | 100 | | | | | | | | | | 50 |
| | Stabilizer 1 | | | | | | | | | | | | | | | |
| | Stabilizer 2 | | | | | | | | | | | | | | | |
| | Stabilizer 3 | | | | | | | | | | | | | | | |
| | Stabilizer 4 | | | | | | | | | | | | | | | |
| | Refrigerant oil 1 | | | | | | 50 | 50 | | | | | 50 | | | |
| | Refrigerant oil 2 | | | | | | | | 50 | 50 | | | | 50 | | |
| | Refrigerant oil 3 | | | | | | | | | | 50 | 50 | | | 50 | |
| | Refrigerant oil 4 | | | | | | | | | | | | | | | 50 |
| PROPERTY | Acid content (as HCl) [ppm] | 17 | 11 | 13 | 14 | 13 | 10 | 13 | 10 | 12 | 14 | 13 | 11 | 16 | 15 | 14 |
| | Total acid value [mg/g KOH] | — | — | — | — | — | 5.2 | 4.3 | 5.5 | 5.1 | 4.8 | 4.2 | 4.7 | 5.3 | 5.2 | 4.5 |

TABLE 23

| | Example | 272 | 273 | 274 | 275 | 276 | 277 | 278 | 279 | 280 | 281 | 282 | 283 | 284 | 285 | 286 (mass %) |
|---|---|---|---|---|---|---|---|---|---|---|---|---|---|---|---|---|
| COMPOSITION | Working medium 41 | 99 | | | | | | | | | | 49.75 | | | | |
| | Working medium 42 | | 99 | | | | | | | | | | 49.75 | | | |
| | Working medium 43 | | | 99 | | | | | | | | | | 49.75 | | |
| | Working medium 44 | | | | 99 | | | | | | | | | | 49.75 | |
| | Working medium 45 | | | | | 99 | | | | | | | | | | 49.75 |
| | Working medium 46 | | | | | | 99 | | | | | | | | | |
| | Working medium 47 | | | | | | | 99 | | | | | | | | |
| | Working medium 48 | | | | | | | | 99 | | | | | | | |
| | Working medium 49 | | | | | | | | | 99 | | | | | | |
| | Working medium 50 | | | | | | | | | | 99 | | | | | |
| | Stabilizer 1 | 1.0 | 1.0 | 1.0 | 1.0 | | | | 1.0 | | | 0.5 | | | | 0.5 |
| | Stabilizer 2 | | | | | 1.0 | 1.0 | | | | 1.0 | | 0.5 | 0.5 | | |
| | Stabilizer 3 | | | | | | | 1.0 | | | | 1.0 | | | | |
| | Stabilizer 4 | | | | | | | | | 1.0 | | | | | 0.5 | |
| | Refrigerant oil 1 | | | | | | | | | | | 49.75 | 49.75 | | | |
| | Refrigerant oil 2 | | | | | | | | | | | | | | | 49.75 |
| | Refrigerant oil 3 | | | | | | | | | | | | | | | |
| | Refrigerant oil 4 | | | | | | | | | | | | | 49.75 | 49.75 | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | — | — | — | — | — | — | — | — | — | <1 | <1 | <1 | <1 | <1 |

TABLE 24

| | Example | 287 | 288 | 289 | 290 | 291 | 292 | 293 | 294 | 295 | 296 | 297 | 298 | 299 | 300 | 301 (mass %) |
|---|---|---|---|---|---|---|---|---|---|---|---|---|---|---|---|---|
| COMPOSITION | Working medium 41 | | | | | | 49.75 | | | | | | | | | |
| | Working medium 42 | | | | | | | 49.75 | | | | | | | | |
| | Working medium 43 | | | | | | | | 49.75 | | | | | | | |
| | Working medium 44 | | | | | | | | | 49.75 | | | | | | |
| | Working medium 45 | | | | | | | | | | 49.75 | | | | | |
| | Working medium 46 | 49.75 | | | | | | | | | | 49.75 | | | | |
| | Working medium 47 | | 49.75 | | | | | | | | | | 49.75 | | | |
| | Working medium 48 | | | 49.75 | | | | | | | | | | 49.75 | | |
| | Working medium 49 | | | | 49.75 | | | | | | | | | | 49.75 | |
| | Working medium 50 | | | | | 49.75 | | | | | | | | | | 49.75 |
| | Stabilizer 1 | | | | | 0.5 | | | | | 0.5 | | | | | 0.5 |
| | Stabilizer 2 | 0.5 | | | | | | | | | | 0.5 | | | 0.5 | |
| | Stabilizer 3 | | 0.5 | | | | 0.5 | 0.5 | | | | | 0.5 | 0.5 | | |
| | Stabilizer 4 | | | 0.5 | 0.5 | | | | 0.5 | 0.5 | | | | | | |
| | Refrigerant oil 1 | 49.75 | | | 49.75 | | | | 49.75 | | | | 49.75 | | | |
| | Refrigerant oil 2 | | | | | | 49.75 | 49.75 | | | 49.75 | | | 49.75 | | |
| | Refrigerant oil 3 | | 49.75 | 49.75 | | | | | | | | 49.75 | | | 49.75 | |
| | Refrigerant oil 4 | | | | | 49.75 | | | | 49.75 | | | | | | 49.75 |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | <1 | <1 | <1 | <1 | <1 | <1 | <1 | <1 | <1 | <1 | <1 | <1 | <1 | <1 | <1 |

TABLE 25

| | Example | 302 | 303 | 304 | 305 | 306 | 307 | 308 | 309 | 310 | 311 | 312 | 313 | 314 | 315 | 316 (mass %) |
|---|---|---|---|---|---|---|---|---|---|---|---|---|---|---|---|---|
| COMPOSITION | Working medium 41 | 49.75 | | | | | | | | | | 100 | | | | |
| | Working medium 42 | | 49.75 | | | | | | | | | | 100 | | | |
| | Working medium 43 | | | 49.75 | | | | | | | | | | 100 | | |
| | Working medium 44 | | | | 49.75 | | | | | | | | | | 100 | |
| | Working medium 45 | | | | | 49.75 | | | | | | | | | | 100 |
| | Working medium 46 | | | | | | 49.75 | | | | | | | | | |
| | Working medium 47 | | | | | | | 49.75 | | | | | | | | |
| | Working medium 48 | | | | | | | | 49.75 | | | | | | | |
| | Working medium 49 | | | | | | | | | 49.75 | | | | | | |
| | Working medium 50 | | | | | | | | | | 49.75 | | | | | |
| | Stabilizer 1 | | | | | | | 0.5 | | | | | | | | |
| | Stabilizer 2 | | | | 0.5 | | | | 0.5 | | | | | | | |
| | Stabilizer 3 | | | 0.5 | | 0.5 | | | | 0.5 | | | | | | |
| | Stabilizer 4 | 0.5 | 0.5 | | | | 0.5 | | | | 0.5 | | | | | |
| | Refrigerant oil 1 | | | | 49.75 | | | 49.75 | | | | | | | | |
| | Refrigerant oil 2 | | | 49.75 | | | 49.75 | | | 49.75 | 49.75 | | | | | |
| | Refrigerant oil 3 | | 49.75 | | | 49.75 | | | 49.75 | | | | | | | |
| | Refrigerant oil 4 | 49.75 | | | | | | | | | | | | | | |
| PROPERTY | Acid content (as HCl) [ppm] | <1 | <1 | <1 | <1 | <1 | <1 | <1 | <1 | <1 | <1 | 14 | 13 | 12 | 12 | 15 |
| | Total acid value [mg/g KOH] | <1 | <1 | <1 | <1 | <1 | <1 | <1 | <1 | <1 | <1 | — | — | — | — | — |

TABLE 26

| | Example | 317 | 318 | 319 | 320 | 321 | 322 | 323 | 324 | 325 | 326 | 327 | 328 | 329 | 330 | 331 (mass %) |
|---|---|---|---|---|---|---|---|---|---|---|---|---|---|---|---|---|
| COMPOSITION | Working medium 41 | | | | | | 50 | | | | | | | | | |
| | Working medium 42 | | | | | | | 50 | | | | | | | | |
| | Working medium 43 | | | | | | | | 50 | | | | | | | |
| | Working medium 44 | | | | | | | | | 50 | | | | | | |
| | Working medium 45 | | | | | | | | | | 50 | | | | | |
| | Working medium 46 | 100 | | | | | | | | | | 50 | | | | |
| | Working medium 47 | | 100 | | | | | | | | | | 50 | | | |
| | Working medium 48 | | | 100 | | | | | | | | | | 50 | | |
| | Working medium 49 | | | | 100 | | | | | | | | | | 50 | |
| | Working medium 50 | | | | | 100 | | | | | | | | | | 50 |
| | Stabilizer 1 | | | | | | | | | | | | | | | |
| | Stabilizer 2 | | | | | | | | | | | | | | | |

TABLE 26-continued

| | Example | 317 | 318 | 319 | 320 | 321 | 322 | 323 | 324 | 325 | 326 | 327 | 328 | 329 | 330 | 331 (mass %) |
|---|---|---|---|---|---|---|---|---|---|---|---|---|---|---|---|---|
| | Stabilizer 3 | | | | | | | | | | | | | | | |
| | Stabilizer 4 | | | | | | | | | | | | | | | |
| | Refrigerant oil 1 | | | | | | 50 | 50 | | | | | | 50 | | |
| | Refrigerant oil 2 | | | | | | | | 50 | 50 | | | | | 50 | |
| | Refrigerant oil 3 | | | | | | | | | | 50 | | | | | 50 |
| | Refrigerant oil 4 | | | | | | | | | | | | 50 | | | |
| PROPERTY | Acid content (as HCl) [ppm] | 17 | 11 | 13 | 14 | 13 | 10 | 13 | 10 | 12 | 14 | 13 | 11 | 16 | 15 | 14 |
| | Total acid value [mg/g KOH] | — | — | — | — | — | 5.2 | 4.3 | 5.5 | 5.1 | 4.8 | 4.2 | 4.7 | 5.3 | 5.2 | 4.5 |

TABLE 27

| | Example | 332 | 333 | 334 | 335 | 336 | 337 | 338 | 339 | 340 | 341 | 342 | 343 | 344 | 345 | 346 (mass %) |
|---|---|---|---|---|---|---|---|---|---|---|---|---|---|---|---|---|
| COMPOSITION | Working medium 51 | 99 | | | | | | 49.75 | | | | | | 49.75 | | |
| | Working medium 52 | | 99 | | | | | 49.75 | | | | | | | 49.75 | |
| | Working medium 53 | | | 99 | | | | | 49.75 | | | | | | | 49.75 |
| | Working medium 54 | | | | 99 | | | | | 49.75 | | | 49.75 | | | |
| | Working medium 55 | | | | | 99 | | | | | 49.75 | | | 49.75 | | |
| | Working medium 56 | | | | | | 99 | | | | | 49.75 | | | 49.75 | |
| | Stabilizer 1 | 1.0 | 1.0 | 1.0 | 1.0 | | | 0.5 | | | | | 0.5 | | | |
| | Stabilizer 2 | | | | | 1.0 | 1.0 | | 0.5 | 0.5 | | | | 0.5 | | |
| | Stabilizer 3 | | | | | | | | | | 0.5 | | | | 0.5 | 0.5 |
| | Stabilizer 4 | | | | | | | | | | | 0.5 | | | | |
| | Refrigerant oil 1 | | | | | | | 49.75 | 49.75 | | | | 49.75 | | | 49.75 |
| | Refrigerant oil 2 | | | | | | | | | | | | | 49.75 | 49.75 | 49.75 |
| | Refrigerant oil 3 | | | | | | | | | | | | | | | |
| | Refrigerant oil 4 | | | | | | | | | 49.75 | 49.75 | | | | | |
| PROPERTY | Acid content (as HCl) [ppm] | <1 | <1 | <1 | <1 | <1 | <1 | <1 | <1 | <1 | <1 | <1 | <1 | <1 | <1 | <1 |
| | Total acid value [mg/g KOH] | — | — | — | — | — | — | <1 | <1 | <1 | <1 | <1 | <1 | <1 | <1 | <1 |

TABLE 28

| | Example | 347 | 348 | 349 | 350 | 351 | 352 | 353 | 354 | 355 | 356 | 357 | 358 | 359 | 360 | 361 (mass %) |
|---|---|---|---|---|---|---|---|---|---|---|---|---|---|---|---|---|
| COMPOSITION | Working medium 51 | | | | 49.75 | | | | | | 100 | | | | | |
| | Working medium 52 | | | | | 49.75 | | | | | | 100 | | | | |
| | Working medium 53 | | | | | | 49.75 | | | | | | 100 | | | |
| | Working medium 54 | 49.75 | | | | | | 49.75 | | | | | | 100 | | |
| | Working medium 55 | | 49.75 | | | | | | 49.75 | | | | | | 100 | |
| | Working medium 56 | | | 49.75 | | | | | | 49.75 | | | | | | 100 |
| | Stabilizer 1 | 0.5 | | | | | | | 0.5 | | | | | | | |
| | Stabilizer 2 | | 0.5 | | | | 0.5 | | | | | | | | | |
| | Stabilizer 3 | | | 0.5 | | 0.5 | | | 0.5 | | | | | | | |
| | Stabilizer 4 | | | | 0.5 | | | | | 0.5 | | | | | | |
| | Refrigerant oil 1 | | | | | | | | 49.75 | | | | | | | |
| | Refrigerant oil 2 | 49.75 | | | | | | 49.75 | | | | | | | | |
| | Refrigerant oil 3 | | 49.75 | | | 49.75 | | | | 49.75 | | | | | | |
| | Refrigerant oil 4 | | | 49.75 | 49.75 | | | | | | | | | | | |
| PROPERTY | Acid content (as HCl) [ppm] | <1 | <1 | <1 | <1 | <1 | <1 | <1 | <1 | <1 | 14 | 13 | 12 | 12 | 15 | 17 |
| | Total acid value [mg/g KOH] | <1 | <1 | <1 | <1 | <1 | <1 | <1 | <1 | <1 | — | — | — | — | — | — |

TABLE 29

| | Example | 362 | 363 | 364 | 365 | 366 | 367 (mass %) |
|---|---|---|---|---|---|---|---|
| COMPOSITION | Working medium 51 | 50 | | | | | |
| | Working medium 52 | | 50 | | | | |

TABLE 29-continued

| | Example | 362 | 363 | 364 | 365 | 366 | 367 (mass %) |
|---|---|---|---|---|---|---|---|
| | Working medium 53 | | | 50 | | | |
| | Working medium 54 | | | | 50 | | |
| | Working medium 55 | | | | | 50 | |
| | Working medium 56 | | | | | | 50 |
| | Stabilizer 1 | | | | | | |
| | Stabilizer 2 | | | | | | |
| | Stabilizer 3 | | | | | | |
| | Stabilizer 4 | | | | | | |
| | Refrigerant oil 1 | 50 | 50 | | | | |
| | Refrigerant oil 2 | | | 50 | 50 | | |
| | Refrigerant oil 3 | | | | | 50 | |
| | Refrigerant oil 4 | | | | | | 50 |
| PROPERTY | Acid content (as HCl) [ppm] | 10 | 13 | 10 | 12 | 14 | 13 |
| | Total acid value [mg/g KOH] | 5.2 | 4.3 | 5.5 | 5.1 | 4.8 | 4.2 |

Present test results revealed that in Examples 1 to 46, Examples 67 to 86, Examples 92 to 131, Examples 152 to 191, Examples 212 to 251, Examples 272 to 311, and Examples 332 to 355 each having had the stabilizer mixed therein, no increase in the acid content or the total acid value was observed, whereas in Examples 47 to 66, Examples 87 to 91, Examples 132 to 151, Examples 192 to 211, Examples 252 to 271, Examples 312 to 331, and Examples 356 to 367 each being Comparative example, each having had no stabilizer mixed therein, an increase in the acid content or the total acid value was observed. Accordingly, it is considered that decomposition and deterioration of the working medium occurred in Comparative examples. Examples of the present invention revealed that with the composition for a heat cycle system including the stabilizer of the present invention, the life of the working medium is prolonged and thereby the composition can be used for a long period of time and the time between exchanges can be extended, and the composition for a heat cycle system of the present invention is suitable for an effective heat cycle system.

The composition for a heat cycle system and the heat cycle system using the composition of the present invention can be utilized for refrigerating apparatuses (such as a built-in showcase, a separate showcase, an industrial fridge-freezer, a vending machine, and an ice making machine), air-conditioning apparatuses (such as a room air-conditioner, a store packaged air-conditioner, a building packaged air-conditioner, a plant packaged air-conditioner, a heat source equipment chilling unit, a gas engine heat pump, a train air-conditioning system, and an automobile air-conditioning system), a power generation system (such as exhaust heat recovery power generation), a heat transport apparatus (such as a heat pipe), and a secondary cooling machine.

What is claimed is:

1. A composition for a heat cycle system comprising:
    a working medium for heat cycle comprising 1-chloro-2,3,3,3-tetrafluoropropene; and
    a stabilizer suppressing deterioration of the working medium for heat cycle, wherein the stabilizer is at least one selected from the group consisting of nitromethane, 1,4-benzoquinone, 3-methoxyphenol, and phenothiazine.

2. The composition for a heat cycle system according to claim 1,
    wherein the 1-chloro-2,3,3,3-tetrafluoropropene comprises (Z)-1-chloro-2,3,3,3-tetrafluoropropene and (E)-1-chloro-2,3,3,3-tetrafluoropropene at a ratio of 51:49 to 100:0 by mass ratio represented by (Z)-1-chloro-2,3,3,3-tetrafluoropropene:(E)-1-chloro-2,3,3,3-tetrafluoropropene.

3. The composition for a heat cycle system according to claim 1,
    wherein the composition comprises 1 mass ppm to 10 mass % of the stabilizer.

4. The composition for a heat cycle system according to claim 1, further comprising a refrigerant oil.

5. The composition for a heat cycle system according to claim 4,
    wherein the refrigerant oil is at least one selected from the group consisting of an ester-based refrigerant oil, an ether-based refrigerant oil, a hydrocarbon-based refrigerant oil, and a naphthenic refrigerant oil.

6. The composition for a heat cycle system according to claim 1,
    wherein the working medium for heat cycle further comprises a saturated hydrofluorocarbon.

7. The composition for a heat cycle system according to claim 1,
    wherein the working medium for heat cycle further comprises a hydrofluoroolefin.

8. The composition for a heat cycle system according to claim 1,
    wherein the working medium for heat cycle further comprises a hydrochlorofluoroolefin other than the 1-chloro-2,3,3,3-tetrafluoropropene.

9. The composition for a heat cycle system according to claim 1,
    wherein a proportion of the 1-chloro-2,3,3,3-tetrafluoropropene to the working medium for heat cycle is 10 to 100 mass %.

10. The composition for a heat cycle system according to claim 9,
    wherein a content of the 1-chloro-2,3,3,3-tetrafluoropropene with respect to 100 mass % of the working medium for heat cycle is 20 to 95 mass %.

11. A heat cycle system comprising the composition for a heat cycle system according to claim 1.

12. The heat cycle system according to claim 11,
    wherein the heat cycle system is a refrigerating apparatus, an air-conditioning apparatus, a power generation system, a heat transport apparatus, or a secondary cooling machine.

13. The heat cycle system according to claim 11,
    wherein the heat cycle system is a centrifugal refrigerator.

14. The heat cycle system according to claim 11, wherein the heat cycle system is a low-pressure centrifugal refrigerator.

\* \* \* \* \*